US010762710B2

(12) United States Patent
Han et al.

(10) Patent No.: US 10,762,710 B2
(45) Date of Patent: Sep. 1, 2020

(54) SYSTEM AND METHOD OF PREDICTING FIELD OF VIEW FOR IMMERSIVE VIDEO STREAMING

(71) Applicant: AT&T Intellectual Property I, L.P., Atlanta, GA (US)

(72) Inventors: Bo Han, Bridgewater, NJ (US); Vijay Gopalakrishnan, Edison, NJ (US); Jackson Jarrell Pair, Marina Del Rey, CA (US); Vikash Sharma, Marina Del Rey, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 168 days.

(21) Appl. No.: 15/901,609

(22) Filed: Feb. 21, 2018

(65) Prior Publication Data

US 2019/0102944 A1   Apr. 4, 2019

Related U.S. Application Data

(60) Provisional application No. 62/566,781, filed on Oct. 2, 2017.

(51) Int. Cl.
*G06T 19/00* (2011.01)
*H04L 29/06* (2006.01)
(Continued)

(52) U.S. Cl.
CPC ............ *G06T 19/006* (2013.01); *G06F 3/013* (2013.01); *G06F 3/04815* (2013.01);
(Continued)

(58) Field of Classification Search
CPC ....... G06T 19/006; G06T 15/20; H04L 67/38; G06F 3/013; G06F 3/04815;
(Continued)

(56) References Cited

U.S. PATENT DOCUMENTS 6,993,074 B2   1/2006  Li et al.
8,681,859 B2   3/2014  Washington et al.
(Continued)

FOREIGN PATENT DOCUMENTS

GB   2525170 A   10/2015
GB   2545999   7/2017
(Continued)

OTHER PUBLICATIONS

Corbillon, Xavier et al., "Viewport-Adaptive Navigable 360-Degree Video Delivery", May 1, 2017, 7 pages.
(Continued)

*Primary Examiner* — Oanh Duong
(74) *Attorney, Agent, or Firm* — Guntin & Gust, PLC; Robert Gingher

(57) ABSTRACT

Aspects of the subject disclosure may include, for example, a process that analyzes image content of an immersive video frame and identifies a first group of segments of the immersive video frame based on the analysis. The segments collectively span an entire space portrayed by the immersive video frame and the first group of segments spans less than the entire space. A size of a display region of an immersive video viewer is determined that spans less than the entire space and a second group of segments is determined based on the first group of segments and the size of the display region. Transport of the second group of segments, spanning less than the entire space, is facilitated via a communication network to the immersive video viewer for presentation, without requiring transmission of all of the segments. Other embodiments are disclosed.

20 Claims, 10 Drawing Sheets

(51) Int. Cl.
*G06F 3/01* (2006.01)
*H04N 21/2343* (2011.01)
*H04N 19/597* (2014.01)
*G06F 3/0481* (2013.01)
*G06T 15/20* (2011.01)
*H04N 21/218* (2011.01)
*H04N 21/234* (2011.01)
*H04N 21/81* (2011.01)

(52) U.S. Cl.
CPC .............. *G06T 15/20* (2013.01); *H04L 67/38* (2013.01); *H04N 19/597* (2014.11); *H04N 21/21805* (2013.01); *H04N 21/234* (2013.01); *H04N 21/234345* (2013.01); *H04N 21/816* (2013.01)

(58) Field of Classification Search
CPC ......... H04N 19/597; H04N 21/234345; H04N 21/21805; H04N 21/234; H04N 21/816
See application file for complete search history.

(56) References Cited

U.S. PATENT DOCUMENTS

| | | | |
|---|---|---|---|
| 9,342,917 B2 | 5/2016 | Chavez et al. | |
| 9,429,752 B2 | 8/2016 | Schowengerdt et al. | |
| 9,690,099 B2 | 6/2017 | Bar-Zeev et al. | |
| 9,721,393 B1 | 8/2017 | Ben-Zacharia et al. | |
| 9,754,167 B1 | 9/2017 | Gordon et al. | |
| 10,313,745 B2 * | 6/2019 | Lederer | H04N 21/8456 |
| 10,523,980 B2 * | 12/2019 | Galpin | G06F 3/012 |
| 2005/0062869 A1 * | 3/2005 | Zimmermann | H04N 7/17318 348/335 |
| 2013/0229581 A1 * | 9/2013 | Joshi | G06T 13/80 348/584 |
| 2013/0266065 A1 | 10/2013 | Paczkowski et al. | |
| 2013/0330055 A1 | 12/2013 | Zimmermann et al. | |
| 2016/0012855 A1 | 1/2016 | Krishnan | |
| 2016/0142697 A1 | 5/2016 | Budagavi et al. | |
| 2016/0198140 A1 | 7/2016 | Nadler | |
| 2016/0260196 A1 | 9/2016 | Roimela et al. | |
| 2016/0267717 A1 | 9/2016 | Bar-zeev et al. | |
| 2016/0277772 A1 * | 9/2016 | Campbell | H04N 21/47 |
| 2016/0353146 A1 | 12/2016 | Weaver et al. | |
| 2017/0026659 A1 | 1/2017 | Lin et al. | |
| 2017/0075416 A1 | 3/2017 | Armstrong | |
| 2017/0223368 A1 | 8/2017 | Abbas et al. | |
| 2017/0236252 A1 | 8/2017 | Nguyen et al. | |
| 2017/0237983 A1 | 8/2017 | Adsumilli et al. | |
| 2017/0251208 A1 | 8/2017 | Adsumilli et al. | |
| 2017/0289219 A1 | 10/2017 | Khalid et al. | |
| 2017/0302918 A1 | 10/2017 | Mammou et al. | |
| 2017/0332117 A1 | 11/2017 | Haritaoglu et al. | |
| 2017/0339392 A1 | 11/2017 | Forutanpour et al. | |
| 2017/0339416 A1 | 11/2017 | Hendry et al. | |
| 2017/0347120 A1 | 11/2017 | Chou et al. | |
| 2017/0347163 A1 | 11/2017 | Wang | |
| 2017/0374375 A1 | 12/2017 | Makar et al. | |
| 2018/0011313 A1 * | 1/2018 | Nahman | G02B 27/01 |
| 2018/0115743 A1 | 4/2018 | Mcloughlin et al. | |
| 2018/0124342 A1 * | 5/2018 | Uyeno | H04N 5/2256 |
| 2018/0160160 A1 * | 6/2018 | Swaminathan | H04L 65/4084 |
| 2018/0165830 A1 * | 6/2018 | Danieau | G06F 40/30 |
| 2018/0176457 A1 * | 6/2018 | Koskan | H04N 5/23238 |
| 2018/0270531 A1 | 9/2018 | Ye et al. | |
| 2019/0104324 A1 | 4/2019 | Han et al. | |
| 2019/0200058 A1 * | 6/2019 | Hall | H04N 21/4667 |
| 2019/0208200 A1 * | 7/2019 | Galpin | H04N 19/105 |
| 2019/0268584 A1 * | 8/2019 | Leleannec | G06T 3/0062 |
| 2019/0313097 A1 * | 10/2019 | Urban | H04N 19/176 |

FOREIGN PATENT DOCUMENTS

| | | |
|---|---|---|
| WO | 2015197818 A1 | 12/2015 |
| WO | 2016171404 A1 | 10/2016 |
| WO | 2017093611 A1 | 6/2017 |
| WO | 2017140945 A1 | 8/2017 |
| WO | 2017205648 | 11/2017 |
| WO | 2017205794 | 11/2017 |
| WO | 2018009746 | 1/2018 |

OTHER PUBLICATIONS

El-Ganainy, Tarek et al., "Streaming Virtual Reality Content", School of Computing Science, Simon Frasier University, Dec. 26, 2016, pp. 1-8.

Qian, Feng et al., "Optimizing 360 Video Delivery Over Cellular Networks", Proceedings of the 5th Workshop on All Things Cellular: Operations, Applications and Challenges, ACM, 2016., Oct. 3-7, 2016, 6 pages.

Han, Bo, "Selective Streaming of Immersive Video Based on Field-of-View Prediction", U.S. Appl. No. 15/828,994, filed Dec. 1, 2017, Dec. 1, 2017, 65 pages.

Hosseini, Mohammad et al., "Adaptive 360 VR Video Streaming: Divide and Conquer!", Multimedia (ISM), 2016 IEEE International Symposium, IEEE, 2016., 2016, 6 pages.

Kuzyakov, Evgeny, "Next-Generation Video Encoding Techniques for 360 Video and VR", Jan. 21, 2016, 7 pages.

Ozcinar, Cagri et al., "Viewport-Aware Adaptive 360 Video Streaming Using Tiles for Virtual Reality", IEEE International Conference on Image Processing 2017, Sep. 2017, 15 pages.

Petrangeli, Stefano et al., "An HTTP/2-Based Adaptive Streaming Framework for 360 Virtual Reality Videos", Proceedings of the 2017 ACM on Multimedia Conference, ACM, 2017., Oct. 23-27, 2017, 9 pages.

* cited by examiner

200

400

300

320

340

500

520

540

560

SYSTEM AND METHOD OF PREDICTING FIELD OF VIEW FOR IMMERSIVE VIDEO STREAMING

CROSS REFERENCE TO RELATED APPLICATIONS

The present application claims priority to U.S. Provisional Patent Application No. 62/566,781, filed Oct. 2, 2017. The contents of the foregoing is hereby incorporated by reference into this application as if set forth herein full.

FIELD OF THE DISCLOSURE

The subject disclosure relates to system and method of predicting field of view for immersive video streaming.

BACKGROUND

Recent years have witnessed increasing commercial progress of the virtual reality (VR) technology, which has eventually stepped out of labs. It is projected to form a substantial market by 2020. Users can now experience VR capabilities on their mobile devices using affordable VR devices such as a Google Cardboard. Immersive videos, also known as 360-degree videos or spherical videos, play an important role in a VR ecosystem. Such immersive videos provide users with panoramic views and create a unique viewing experience Immersive videos, such as 360-degree videos can be recorded by specially adapted cameras, such as omnidirectional cameras or camera array systems (e.g., Facebook Surround 360 Open Edition camera design and stitching code). They simultaneously record all 360 degrees of a scene that can be "wrapped" onto at least a portion of a 3D sphere, with the cameras at its center.

BRIEF DESCRIPTION OF THE DRAWINGS

Reference will now be made to the accompanying drawings, which are not necessarily drawn to scale, and wherein.

DETAILED DESCRIPTION

Figure 1:
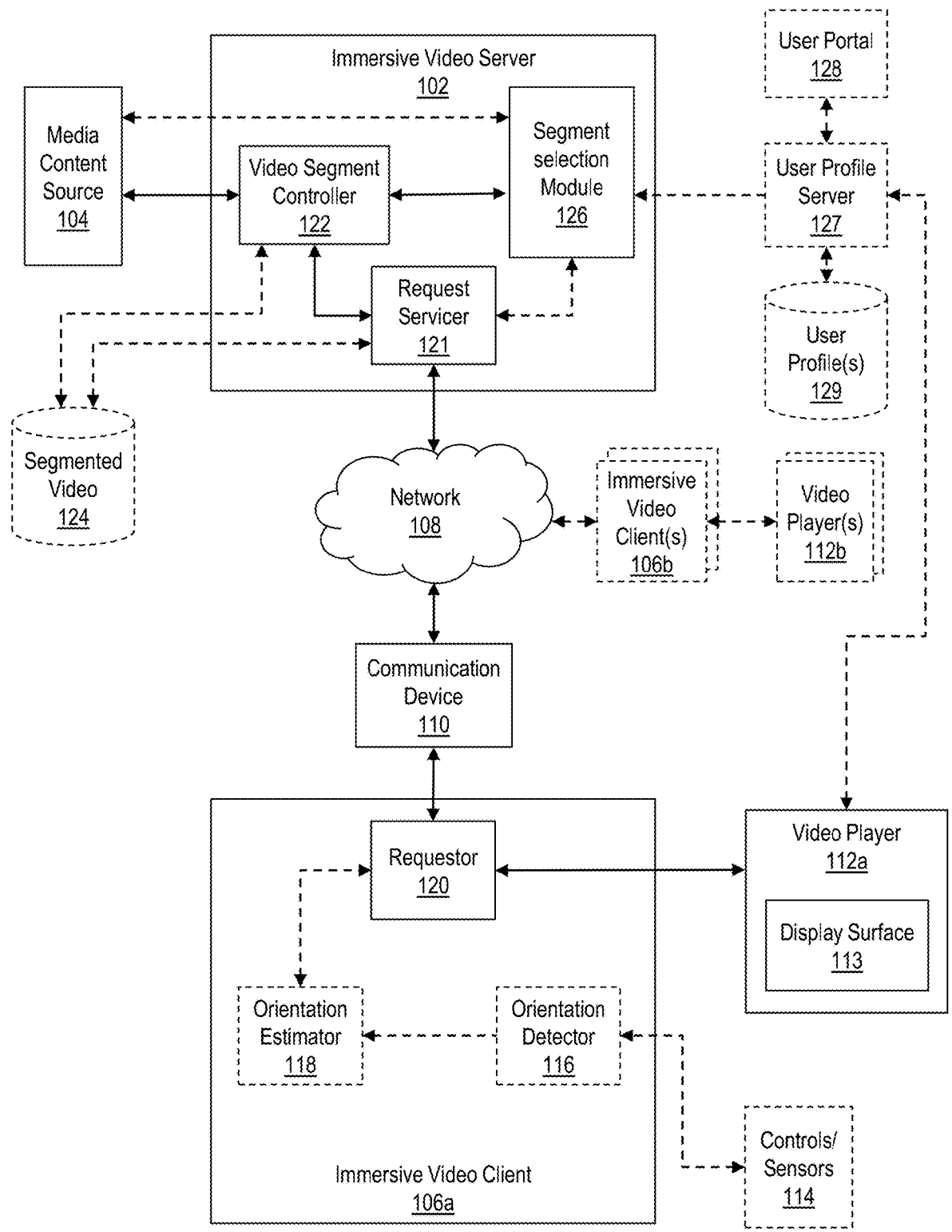
FIG. 1 depicts an illustrative embodiment of an immersive video processing system.

The subject disclosure describes, among other things, processing a spatially segmented immersive video frame and/or group of frames, identifying a sub-region or portion of segments of a frame or group of frames, e.g., a video chunk, being viewed and/or likely to be viewed, and facilitating transport of less than entire immersive video frame or group of frames. The identifying of one or more sub-regions can be based on one or more of the video content itself, a viewer profile, statistics associated with a particular viewer, multiple views, a current and/or predicted direction, position or orientation of a field of view of a viewing system. A subset of the segments of any given frame or group of frames corresponding to a predicted viewing area can be delivered to user equipment via transport network according to a first quality, while one or more other subsets of the segments, e.g., corresponding to predicted out-of-viewing region can be delivered at a lesser quality and/or not transported at all. The immersive viewing system can thus display the field-of-view associated with the predicted orientation/position at a presentation time, while providing opportunities for significant savings in one or more of bandwidth, processing resources, and storage resources that would have otherwise been applied to delivery of the full original immersive video media item.

One or more aspects of the subject disclosure include a process that analyzes image content of a first immersive video frame of a sequence of immersive video frames, to obtain an analysis result. A first group of spatial segments of a number of spatial segments of the first immersive video frame is selected based on the analysis result. The number of spatial segments collectively span an entire space portrayed by the first immersive video frame, whereas the first group of spatial segments spans less than the entire space portrayed by the first immersive video frame. A field-of-view of an immersive video viewer is determined, wherein the field-of-view spans less than the entire space portrayed by the first immersive video frame. A second group of spatial segments of the number of spatial segments is identified based on the selecting of the first group of spatial segments and the determining of the field-of-view. The second group of spatial segments spans less than the entire space portrayed by the first immersive video frame. Transport is facilitated of the second group of spatial segments via a communication network to the immersive video viewer for presentation at the immersive video viewer, without requiring transmission of all of the number of spatial segments of the first immersive video frame.

One or more aspects of the subject disclosure include non-transitory, machine-readable storage medium, including executable instructions that, when executed by a processing system including a processor, facilitate performance of operations. The operations include processing image content of an immersive video frame of a sequence of immersive video frames, to obtain an image processing result. A first group of segments of a number of segments of the immersive video frame is selected based on the image processing result, wherein the number of segments collectively span an entire space portrayed by the immersive video frame, and wherein the first group of segments spans less than the entire space portrayed by the immersive video frame. A field-of-view of an immersive video viewer is determined, wherein the field-of-view spans less than the entire space portrayed by the immersive video frame. A second group of segments of the number of segments is determined based on the selecting of the first group of segments and the determining of the field-of-view. The second group of segments spans less than the entire space portrayed by the immersive video frame. Transport of the second group of segments is facilitated via a communication network to the immersive video viewer for presentation at the immersive video viewer, without requiring transmission of all of the number of segments of the immersive video frame.

One or more aspects of the subject disclosure include a device, having a processing system including a processor and a memory that stores executable instructions that, when executed by the processing system, facilitate performance of operations. The operations include processing image content of an immersive video frame of a sequence of immersive video frames, to obtain an image processing result. A first group of segments of a number of segments of the immersive video frame is identified based on the image processing result. The number of segments collectively span an entire space portrayed by the immersive video frame and the first group of segments spans less than the entire space portrayed by the immersive video frame. A size of a display region of an immersive video viewer is determined, wherein the size of the display region spans less than the entire space portrayed by the immersive video frame. A second group of segments of the number of segments is determined based on the identifying of the first group of segments and the determining of the size of the display region. The second group of segments spans less than the entire space portrayed by the immersive video frame. Transport of the second group of segments is facilitated via a communication network to the immersive video viewer for presentation at the immersive video viewer, without requiring transmission of all of the number of segments of the immersive video frame.

FIG. 1 depicts an illustrative embodiment of an immersive video processing system 100. The system 100 includes an immersive video server 102 in communication with a video content source 104. The video content sources 104 provides immersive video content, such as 360-degree video media items, panoramic video media items, stereo video media items, 3D video media items, and the like. The immersive video server 102 is in further communication with an immersive video client 106 via a transport network 108.

In the illustrative example, the transport network 108 includes a wireless mobile network, such as a cellular network. It is understood that the transport network 108 can include, without limitation, one or more wireless networks, such as, mobile cellular networks, WiFi networks, satellite networks, terrestrial radio networks, and the like. Alternatively or in addition, the transport network 108 can include one or more wired network, such as Ethernet, SONET, circuit-switched network components, e.g., SS7, cable, and the like. Although the example transport network 108 is illustrated by a single cloud, it is understood that the network 108 between the immersive video server 102 and the immersive video client 106 can include one or more networks of the same, similar and/or different configurations, e.g., combinations of wired and wireless, terrestrial, satellite, and the like.

Continuing with the illustrative example, the immersive video client 106 is in network communication with the transport network 108 by way of a communication device 110. The communication device 110 can include, without limitation, any of the various devices disclosed herein or otherwise generally known to those skilled in the art of communications, such as mobile telephones, tablet devices, laptops, telephone handsets, and the like. In a context of machine-to-machine (M2M) communications, e.g., according to an Internet of Things (IoT) paradigm, the mobile device 110 can include a machine, such as an appliance, a vehicle and the like.

The immersive video client 106 is in further communication with one or more of a video player 112a and one or more controls and/or sensors 114. For example, the sensor 114 can include an inertial sensor, such as an accelerometer, that can detect and/or estimate a position and/or a change in position of the display surface 113 of the video player 112a. Sensors 114 can include those commonly found in smart phones and/or tablet devices. It is understood that in at least some embodiments, the sensors 114 can be internal to and/or otherwise attached to the video player 112 and/or the display surface 113. Accordingly, the sensors 114 can detect position and/or orientation of the display surface 113 based on the physical orientation and/or change in orientation of the video player 112a. Alternatively or in addition, the sensors 114 can be separate from the video player 112a. For example, the sensors 114 can include one or more of a motion sensor and/or a video sensors adapted to detect motion and/or position of the video player 112a. In at least some embodiments, a position and/or orientation of the display surface 113 of the video player 112a can be inferred or otherwise determined from a predetermined configuration of the display surface 113 within the video player 112a.

The example immersive video client 106, includes an orientation detector 116, an orientation estimator 118 and a requestor 120. The orientation detector 116 is in communication with the sensors 114 and adapted to determine an orientation of the video player 112a, or more particularly, of a display surface 113 of the video player 112a based on sensor data obtained from the sensors 114.

The orientation of the video player 112a and/or display surface 113 can include, without limitation, a first direction, such as an azimuth angle and a second direction, such as an elevation angle. The azimuth angle and elevation angle, taken together can define a pointing direction of a normal to the display surface 113. In at least some embodiments, the azimuth angle and elevation angle can be further combined with a twist or rotation angle that further defines a rotational orientation of the display surface 113 with respect to the pointing direction.

In at least some embodiments, an orientation and or position of the display surface 113 can be defined in reference to a center of a coordinate system. Example coordinate systems can include spherical coordinate systems, cylindrical coordinate systems, polar coordinate systems, Cartesian coordinate systems and the like. By way of example, the orientation or position of the display surface 113 can be defined by rotations about orthogonal axis, such as rotations about x, y and z axes of a rectangular coordinate system. These angles are sometimes referred to as pitch, yaw and roll.

In at least some embodiments, the immersive video server 102 includes a request servicer 121 and a video segment controller or segmenter 122. The example video segmenter 122 is in communication with the video content source 104, and adapted to segment at least a portion of an immersive video media item obtained from the video content source 104 into a plurality of segments including spatial segments, tiles or sub-regions. For example, the segmenter 122 can divide an immersive video frame into a number of segments, sub-regions or sub-frames. For a rectangular immersive video frame, the segments or sub-regions can be rectangles. It is understood that shapes of the segments and sub-regions can be rectangular and/or other shapes. The shapes of the segments can be regular, irregular, uniform and/or different.

The orientation estimator 118, in turn, provides an indication of an estimated position and/or orientation to the requestor 120. In at least some embodiment, the estimated position/orientation is further associated with a future time at which the position/orientation of the video player 112a and/or display surface 113 has been determined. The requestor 120, in at least some embodiments, can be adapted to determine other information, such as a field-of-view of the video player 112a and/or display surface 113. The field-of-view can be defined according to one or more of spatial dimensions on a mapped surface, angular ranges and/or pixel ranges. It is understood that in at least some embodiments, that the field of view may differ according to one or more of orientation, e.g., looking down versus straight ahead, a type of projection used in association with the immersive video frame, and so on.

In at least some embodiments, the requestor 120 receives an indication and/or is otherwise pre-configured with information describing how the segmentation/sub-regions are/have been applied to the immersive video frames. Together with the predicted position/orientation and the field of view, the requestor 120 can determine which segments/sub-regions will fall in and/or near the display surface 113 at the future time associated with the prediction, e.g., 0.5 sec, or 1-sec into the future.

In at least some embodiments, the prediction time can be selectable and/or variable. For example, the prediction time can be based on one or more of data transfer size and/or bandwidth, network conditions, subscription levels, quality of experience, and the like. It is understood that network bandwidth and/or latency can depend upon network conditions, such as congestion, interference, signal propagation loss, and the like. Accordingly, the prediction time can be based upon an estimate of a difference between a time at which a request is made by the requestor 120 and a time at which the requested segments/regions are of a requested segment size are delivered to the immersive video client. Other delays can be factored into this determination, such as processing delays of one or more of the immersive video client, the video player 112a and/or the immersive video server 102.

The request servicer 121 is in communication with the requestor 120 via a network, such as the transport network 108. The requestor 120 submits a request for a group of segments or sub-regions of a particular immersive video frame. The request servicer 121 receives the request and responds by facilitating transfer of the requested segments/sub-regions via the transport network 108. It is understood that the request servicer 121 can service a single request by sequential, e.g., serial, delivery of individual segments of the requested group, and/or contemporaneous, e.g., parallel, delivery of multiple segments of the requested group. In at least some embodiments, individual requests can be made and processed according to each subsequent video frame of an immersive video media item. Alternatively or in addition, the processing can be applied to groups of frames. For example, a single prediction can be made at a prediction time, and then used to process more than one frame of the immersive video media item. In some instances, multiple frames include separate frames of a stereo and/or 3D immersive video media item, e.g., left and right frame components. In at least some embodiments, the same request is made for successive video frames of an immersive video media item. This can provide some relief to the processing and cut down on overhead, possibly at a sacrifice of accuracy, due to increased estimate times.

In some embodiments, the segment selection module 126 is configured to determine and/or otherwise access statistics based multiple requests that can be used, in turn, by one or more of the request servicer 121, the video segmenter 122, the requestor 120 and/or the orientation estimator 118. For example, statistics can be used to track requests received from multiple immersive video clients 106a, 106b (generally 106) and or video players 112a, 112b (generally 112). The statistics can associate past requests with one or more of immersive video media item. It is envisioned that some regions of an immersive video frame may be requested more than others based on a nature of the immersive video media item content. Accordingly, segments can be associated with a frequency, based on past requests. Alternatively or in addition, the segment selection module 126 can associate one or more of network conditions, time of day, day of week, service level, requestor profile, region, demographics and the like. Statistics can be determined according to one or more of the example parameters and used in association with subsequent requests to improve system performance by reducing errors, reducing quantities of invisible segments as may be associated with requests to manage errors and so on.

In at least some embodiments, the shapes can be adapted or otherwise selected based on one or more of the nature of the immersive video frame, the display surface, one or more projection algorithms as may be applied and so on. For example, the shapes can correspond to one or more of a shape of the field of view, a shape of a primary viewing region, a shape of an object depicted within the video, a mapping scheme, e.g., of the 3D space to a 2D reference frame, and the like. For a spherical projection of a 360-degree video, the sub-regions can be portions of a spherical surface, e.g., defined according to a spherical coordinate system. Alternatively or in addition, the sub-regions can be portions of a cylindrical surface and/or portions of a rectangular surface. Even though the projected surface portrayed in the immersive video frame may confirm to a particular geometry, it is understood that the shape and/or size of the segments and/or sub-regions can be the same, similar and/or different. For example, the segments and/or sub-regions can be determined according to a projection algorithm, e.g., mapping a spherical surface to a cylindrical and/or rectangular surface.

It is generally understood that segmentation of an immersive video media item can be performed in real time or near-real time, e.g., in association with and/or responsive to a particular request from a requestor 120 of a particular immersive video client 106. Alternatively or in addition, segmentation can be performed beforehand, e.g., offline, and stored for later use. In some embodiments, segmentation data alone or in combination with a segmented version of the immersive video media item can be stored in an optional segmented video repository 124 (shown in phantom).

Segmentation data can include, without limitation, identification of the tiles, segments and/or sub-regions of a segmented immersive video media item. For example, this can include individually addressable segments, e.g., segment (i, j) of an M×N array of segments of a particular immersive video frame. As immersive video media items can include arrays of immersive video frame, it is understood that a common segment referencing and/or indexing scheme can be applied to more than one, e.g., all, frames of a particular immersive video media item. Accordingly, segments and/or sub-regions can be identified and addressed independently and/or collectively in groups. Groups of segments and/or sub-regions can conform to a particular shape, e.g., a contiguous shape, such as a rectangle, an oval, and the like. Alternatively or in addition, segments and/or sub-regions can be addressed according to ranges.

The immersive video server also includes a segment selection module 126. The example segment selection module 126 is in communication with the video segment controller 122. In some embodiments the segment selection module 126 is in further communication with one or more of the request servicer 121, and the media content source 104. In operation, the segment selection module 126 identifies a group of segments of an immersive video frame, or video chunk consisting of a group of multiple frames. The identified group of segments can be shared with the video segment controller 122, which obtains the identified group of segments from the media content source 104 and/or from the segmented video repository 124. For embodiments in which segmentation is performed in on the fly and/or in response to a viewing request, the segment selection module 126 can identify a region of interest within an immersive video frame obtained from the media content source 104. The region of interest can be provided to the video segment controller 122 that performs segmentation and/or segment selection based on the identified region of interest. A resulting group of segments is provided to the request servicer 121 for transport to a communication device 110 in communication with a vide player. Identification of the region of interest and/or the group of segments can be based on one or more of the various analysis, identification and/or selection techniques disclosed herein.

In some embodiments, an immersive video client 106 includes an viewing direction, position, and/or orientation detector 116 that determines actual and/or estimated directions, positions, and/or orientations of the video player and/or display surface 113, based on input from the sensors 114. Actual orientations are provided to the orientation estimator 118, which, in turn, estimates a direction, position and/or orientation of the video player 112 and/or the display surface 113. In at least some embodiments, the orientation estimator 118 predicts a future directions, position and/or orientations of the field of view, e.g., as disclosed in U.S. patent application Ser. No. 15/828,994, filed on Dec. 1, 2017, entitled "Selective Streaming of Immersive Video Based on Field-Of-View Prediction," and incorporated herein by reference in its entirety. One or more of the field of view size, direction, position, orientation and/or estimation can be provided to the request servicer 121 and shared with one or more of the video segment controller 122 and/or the segment selection module 126. For example, the segment selection can be based on the immersive video content itself in combination with one or more of the field of view size, orientation and/or prediction.

In some embodiments, the segment selection module 126 can access user information. For example, user information can be obtained from a user profile, e.g., stored and/or otherwise maintained in a user profile repository 129. The example system 100 includes an optional user profile server 127 in communication with one or more of a user profile repository 129 and a user portal 128 (shown in phantom). The segment selection module 126 can base selection of a group of segments on user information according to any of the various techniques disclosed herein. For example, the age of a user can be used to facilitate identification of objects of interest. Younger viewers may be more drawn to colors, whereas older viewers may be more drawn to movement, and/or image complexity. Still other viewers may be drawn to various immersive video content features based on age, gender, past viewing history, past immersive viewing history, expressed interests, e.g., sports, drama, and so on.

The request servicer 121 is in communication with the requestor 120 via the transport network 108. The requestor 120 submits a request for immersive video content. The request can be in the form of a general request for the immersive video media content item. Alternatively or in addition, the request itself can identify a group of segments or sub-regions of a particular immersive video frame. The request servicer 121 receives the request and responds by facilitating transfer of the requested segments/sub-regions via the transport network 108, without necessarily providing all of the segments of any particular immersive video frame. This results in savings of one or more of bandwidth, processing memory or storage, etc.

It is understood that the request servicer 121 can service a single request by sequential, e.g., serial, delivery of individual segments of the requested group, and/or contemporaneous, e.g., parallel, delivery of multiple segments of the requested group. In at least some embodiments, individual requests can be made and processed according to each subsequent video frame of an immersive video media item. Alternatively or in addition, the processing can be applied to groups of frames. For example, a single prediction can be made at a prediction time, and then used to process more than one frame of the immersive video media item. In some instances, multiple frames include separate frames of a stereo and/or 3D immersive video media item, e.g., left and right frame components. In at least some embodiments, the same request is made for successive video frames of an immersive video media item. This can provide some relief to the processing and cut down on overhead, possibly at a sacrifice of accuracy, due to increased estimate times.

Figure 2:
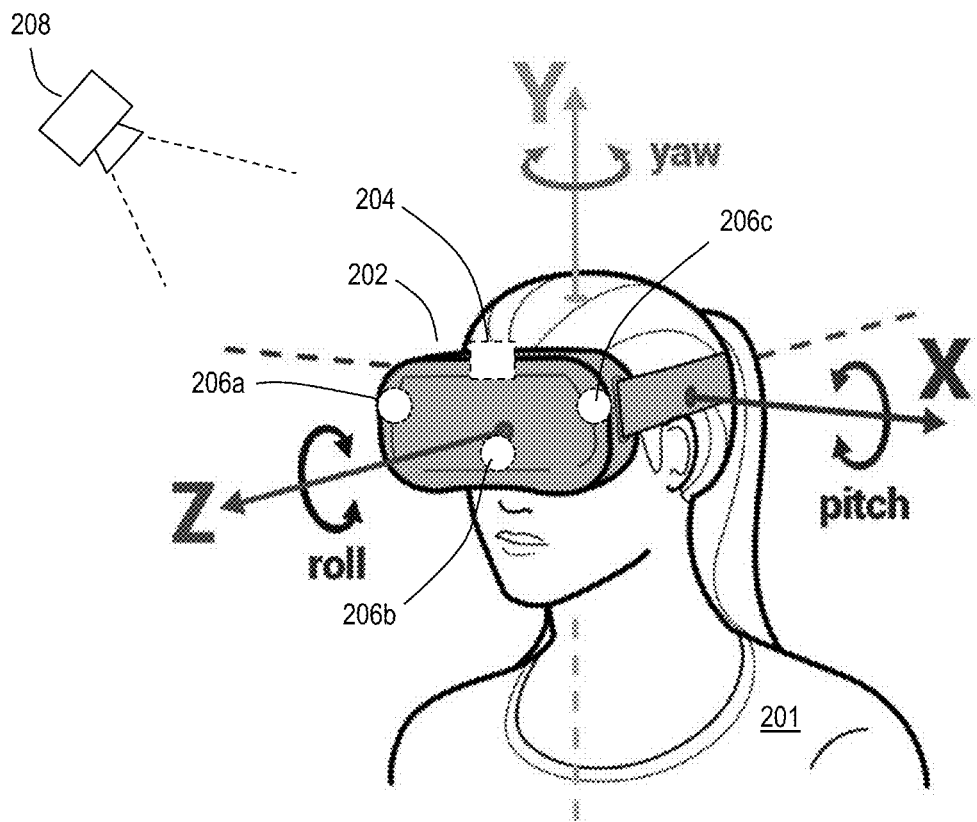
FIG. 2 depicts an illustrative embodiment of a video viewing system.

When watching an immersive, e.g., 360-degree, video, a viewer 112 at a center of an immersive video media presentation, e.g., at a spherical center, can freely control her viewing direction, so each playback creates a unique experience. As shown in FIG. 2, a user 201 wearing a VR headset 202 can adjust her orientation by changing the pitch, yaw, and/or roll of the VR headset 202, which correspond to rotating along one or more of the X, Y, and Z axes, respectively. Then a 360 video player, e.g., within the VR headset 202, computes and displays a viewing area, i.e., a display surface, based on the orientation and the field-of-view (FoV). The FoV can define an extent of the observable area, which is usually a fixed parameter of a VR headset (e.g., 110° horizontally and 90° vertically).

The example VR headset 202 can be equipped with a position and/or orientation sensor 204, such as position/orientation sensors available on smartphones, gaming goggles and/or tablet devices. Alternatively or in addition, the VR headset 202 includes one or more reference markers

206*a*, 206*b*, 206*c* (generally 206). The reference markers 206 are spaced apart in a predetermined configuration. An external sensor, such as a video camera 208, is positioned to observe the FR headset 202 during active use. The external sensor 208 detects positions of the reference markers 206. Further processing, e.g., by an orientation detector 116 (FIG. 1) can determine a position and/or orientation of the VR headset 202 based on the detected/observed positions of the reference markers 206.

Such immersive videos are very popular on major video platforms such as YOUTUBE® and FACEBOOK® platforms. Despite their popularity, the research community appears to lack an in-depth understanding of many of its critical aspects such as performance and resource consumption. The disclosure provided herein is intended to fill this gap by investigating how to optimize immersive video delivery over wireless mobile, e.g., cellular, networks, which are anticipated as forming a key infrastructure that facilitates ubiquitous access of network accessible VR resources, e.g., in the cloud. Measurements were conducted on two commercial 360-degree video platforms: YouTube and Facebook to obtain an understanding the state-of-the-art of 360-degree video delivery. To a large extent, 360 video inherits delivery schemes from traditional Internet videos. This simplifies the deployment, but makes 360-degree video streaming very cellular-unfriendly, because the video player always fetches the entire video including both visible and invisible portions. This leads to tremendous resource inefficiency on cellular networks with limited bandwidth, metered link, fluctuating throughput, and high device radio energy consumption.

As an important component of the virtual reality (VR) technology, immersive videos provide users 201 with panoramic views allowing them to freely control their viewing direction during video playback. Usually, a video presentation system or a player 202 displays only the visible portion of an immersive video. Thus, fetching the entire raw video frame wastes bandwidth. The techniques disclosed herein address the problem of optimizing immersive video delivery over wireless, e.g., cellular, networks. A measurement study was conducted on commercial 360 video platforms. A cellular-friendly streaming scheme is disclosed that delivers only a 360 video's visible portion based on head movement prediction. Viewing data collected from real users was used to demonstrate feasibility of an approach that can reduce bandwidth consumption by up to 80% based on a trace-driven simulation.

Conceptually, a novel cellular-friendly streaming scheme for immersive videos avoids downloading an entire immersive video, instead only fetching those parts, e.g., spatial segments or portions, of the immersive video that are visible to the user 201 in order to reduce bandwidth consumption associated with the video transfer. As display of any of the portion of the immersive video requires that the portion be fetched or otherwise downloaded, the disclosed approach benefits from a prediction of a viewer's head movement (to determine which portion of the immersive video view to fetch). Five users' head movement traces were collected when watching real YouTube 360 videos. Trace-driven analysis indicated that, at least in the short term, a viewers' head movement can be accurately predicted, e.g., with an accuracy >90%, by even using simple techniques such as linear regression. Design considerations include handling prediction errors and integration with DASH and HTTP.

Examples of popular video platforms include, without limitation, YouTube and Facebook. For example, a YouTube app or Facebook can be used to view 360 videos on a smartphone, such as a Samsung Galaxy phone running Android, and/or a Chrome browser on a Windows 10 laptop using a Chrome debugging tool to analyze HTTPS transactions, and/or redirecting traffic during video playback to a "man-in-the-middle" proxy (using mitmproxy).

Both YouTube and Facebook presently encode 360 videos into a standard H.264 format in an MP4 container. It is understood that a 360 video can be playable in conventional media players, e.g., only showing raw frames as exemplified in by a large image 300 in FIG. 3A. As shown, the raw frame 300 is distorted because it was projected from the 3D panoramic sphere. When a viewing area of a virtual reality headset is determined, the visible portion is then reversely projected from the raw frame to the screen, as illustrated by the two smaller images 320, 340 shown in FIG. 3B and FIG. 3C.

The raw video frames of the different 360 sources, e.g., YouTube and Facebook, exhibit different visual "patterns" based on their use of different projection algorithms. For example, YouTube was found to employ an equi-rectangular projection that directly uses the latitude and longitude on a sphere as the vertical and horizontal coordinates, respectively, on the raw frame. Facebook was found to employ a different projection scheme, referred to as Cube Map that offers less distortion in the polar areas of the sphere.

Both YouTube (on Android app) and Facebook (on Chrome for Windows 10) use progressive download over HTTP, a widely used streaming technique, to deliver 360 videos. Progressive download allows a client to start playing the video before it is fully downloaded. It is realized using HTTP byte range request.

Both video platforms support multiple encoding bitrates for 360 videos. The viewer can switch between standard definition (SD) and high definition (HD) versions on Facebook. YouTube provides up to 8 bitrate levels from 144s to 2160s. Note the video quality numbers refer to the resolution of the entire raw frame 300 FIG. 3A, in which the viewer only sees a small portion at any given time, e.g., a first portion 302 depicted in the image 320 of FIG. 3B or a second portion 304 depicted in the image 340 of FIG. 3C. Therefore, to achieve the same user-perceived playback quality, the raw frame quality of a 360 video has to be much higher than that of a non-360 video. For a decent user experience, a 360 video can be streamed at at least 1080s, whereas, a reasonable quality for conventional videos can be less, e.g., 480p. However, when watching the video in FIG. 3A under 480s, the quality can be unacceptably bad, e.g., depending upon the viewing angle, because the viewer 202 (FIG. 2) in fact has a stretched view of a subarea of a 480s frame.

Improved techniques for immersive video streaming over cellular networks disclosed herein reduce bandwidth consumption, preferably with little or no detrimental effects to playback observed by a VR headset 202 (FIG. 2). Basically, instead of downloading everything, a client 106 fetches the parts that are visible to the user. In some embodiments, immersive video regions, e.g., segments, outside of a visible region can be provided at a lower quality, at a lower resolution and/or updated less frequently. Alternatively or in addition, at least some of the segments outside of an estimated visual region can be excluded from transport altogether. In at least some embodiments, a bandwidth-efficient 360 video VR display system includes a mechanism that allows a client to download a subarea of a video chunk. In some embodiments, a determination of what portion(s) of a frame to fetch can be based on an estimate of a current field of view. Alternatively or in addition, a determination of what portion(s) of a frame to fetch can be based on one or more of content of the vide itself, a user profile, user preferences, viewing statistics of others, and so on. Preferably, the prediction is robust and efficient. In at least some instances the system 100 tolerates inaccurate predictions by strategically sacrificing bandwidth in certain situations. In at least some embodiments, the system incurs minimal changes to the client player the server, or both.

For traditional videos, to support simultaneous download and playback, a video is temporally segmented into chunks or byte ranges. To support downloading a segment, subregion or sub-area of a video chunk, the video also needs to be spatially segmented. This can be realized in an online manner—the client 106 computes the target area of a chunk, and embeds them into HTTP request parameters; the server then dynamically generates a smaller chunk containing only the target area and transmits it to the client. This approach may suffer from two drawbacks. First, it can increase the server-side computational overhead. Second, due to projection, the target area is not a rectangle, making it hard for the client to specify the target area.

Figure 4:
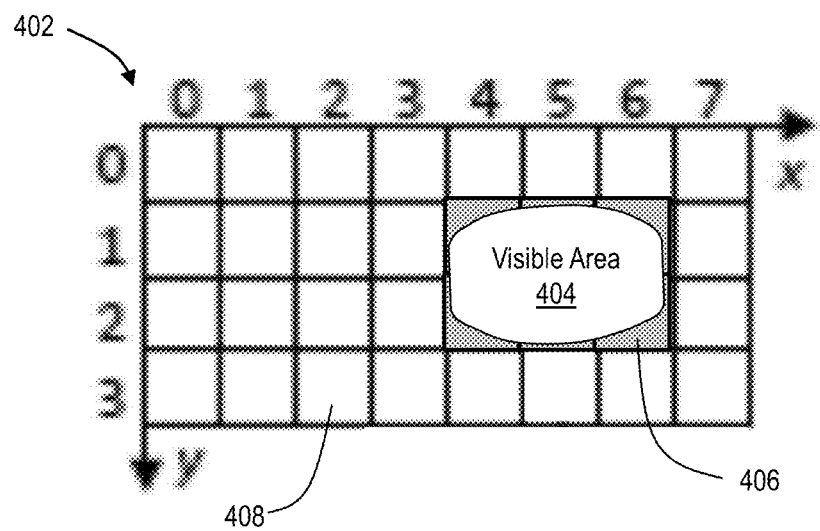
FIG. 4 depicts an illustrative embodiment of spatial segmentation of a video frame into tiles.
Figure 3A:
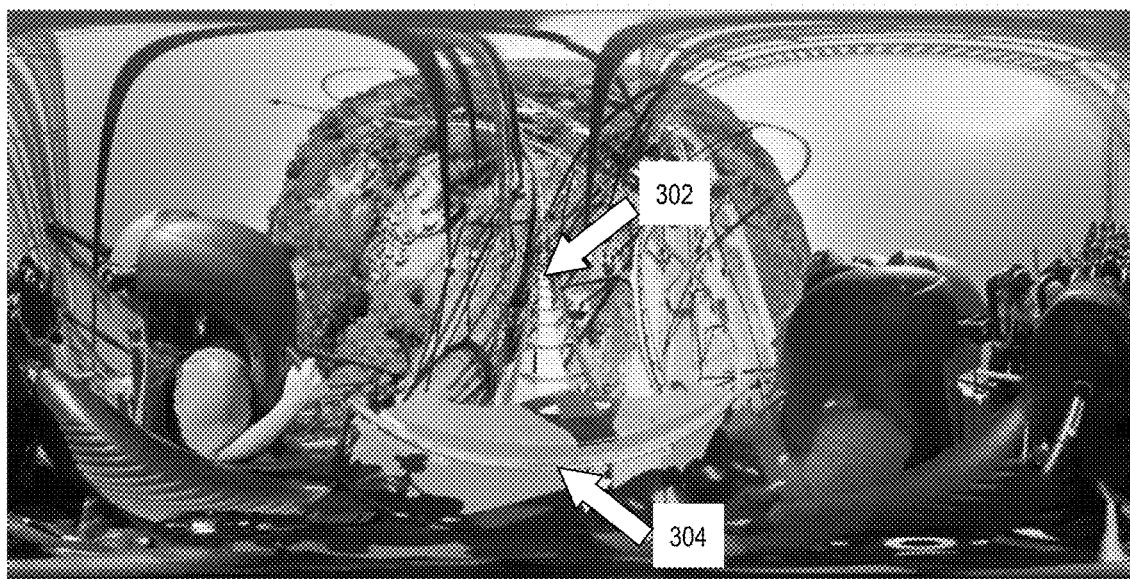
FIG. 3A depicts an illustrative embodiment of a raw frame of immersive video.
Figure 3B:
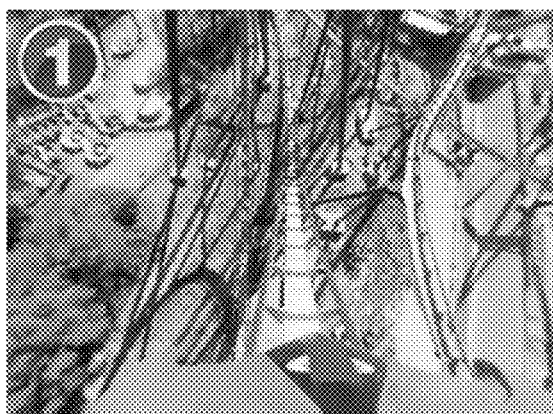
FIGS. 3B and 3C depict illustrative embodiments of immersive frames visible by the video viewing system of FIG. 2, when a viewer is looking at different viewpoints within the immersive image frame.
Figure 3C:
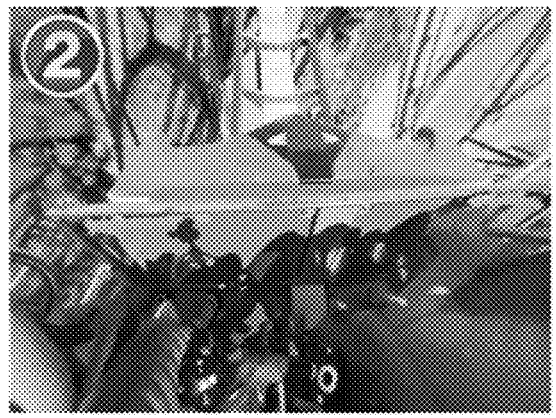

In at least some embodiments, the immersive video media item is spatially segmented offline. For example, each 360 video chunk can be pre-segmented into multiple smaller chunks, referred to herein as tiles. A tile can have the same duration as a chunk, while only covering a subarea of the chunk. At least one way to generate the tiles is to evenly divide a chunk containing projected raw frames into m*n rectangles each corresponding to a tile. Suppose the projected visible area is θ. The client only requests for the tiles that overlap with θ. An example pre-segmented chunk 402 is illustrated in FIG. 4, where m=8 and n=4, resulting in 32 tiles 408 and where the visible area, θ is illustrated as a bounded region 404. The client may only request the six tiles ($4 \le x \le 6$; $1 \le y \le 2$) overlapping with the visible area 404. Note that due to projection, despite the viewer's field-of-view being fixed, the size of the visible area 404 and thus the number of requested tiles 406 may vary. For example, under equi-rectangular projection, as shown in FIG. 3A, more tiles are needed when the viewer looks towards a downward direction 304 compared to when she looks ahead, e.g., in a straight forward direction 302.

Besides the above approach, an alternative and more complex way is to apply segmentation directly on an immersive projection surface, such as a 3D sphere of a 360-degree video, instead of on a projected 2D raw frame or group of frames 402 so that each tile covers a fixed angle, e.g., a fixed solid angle. This makes the number of tiles to be requested irrespective of user's viewing direction (but their total bytes may still vary).

Performing the spatial segmentation of immersive video frames offline can reduce and/or otherwise eliminate server-side overhead. Multiple tiles 408 can be requested in a single bundle to reduce network roundtrips. A tiles' metadata such as positions and/or addresses (e.g., web addresses or URLs) can be embedded in a metafile exchanged at the beginning of a video session.

If a viewer's head movement during a 360 video session is known beforehand, an optimal sequence of tiles can be generated that minimizes the bandwidth consumption. To approximate this in reality, a prediction of head movement is determined, e.g., according to a pitch, yaw, and roll and/or a change of pitch, yaw, and roll.

Estimation errors can be handled using one or more of several strategies. First, due to the online and sliding-window nature of the field-of-view estimation scheme, a previous inaccurate prediction might be fixed by a more recent and accurate prediction. If the new tiles corresponding to the updated prediction can be fetched before the playback deadline, the penalty is only wasted bandwidth. In at least some embodiments, such fixes can be prioritized.

In at least some embodiments, estimations can leverage crowd-sourced statistics. Popular 360 videos from commercial content providers and video sharing websites attract a large number of viewers. A users' viewing behaviors are often affected by the video content, such that at certain scenes, viewers are more likely to look at a certain spots or directions. Consider an example of a mountain climbing video. When "standing" at the peak, viewers may want to enjoy the view by looking all around.

Based on the above intuition, crowd-sourced viewing statistics, which can be collected, e.g., by video servers, can be used to complement head movement prediction. Viewing statistics can be leveraged to estimate the video abandonment rate and to automatically rate video contents. In the context of 360 videos, for each chunk, a server records download frequencies of its tiles, and provides client players with such statistics through metadata exchange. A tile's download frequency can be defined as a number of video sessions that fetch this tile divided by the total number of sessions accessing this video. The client can (optionally) use the statistics to guide the download strategy of OOS tiles. For example, a simple strategy is to expand the set of OOS tiles to include tiles whose download frequencies are greater than a configurable threshold. The threshold trades off between bandwidth consumption and user experience.

In at least some embodiments, the estimations and/or selective video fetch of portions of 360 video frames can be integrated with DASH and/or HTTP. Although currently most immersive videos use progressive download, it is envisioned they may switch to a Dynamic Adaptive Streaming over HTTP (DASH). Extensive research has been conducted on improving the QoE of DASH video. A DASH video is split into chunks encoded with multiple discrete bitrate levels; a video player can switch between different bitrate levels at a chunk boundary. In contrast, 360 videos involve more complexity, because the player needs to make decisions at both the temporal and spatial dimension.

An important component of a DASH scheme is its rate adaptation algorithm, which determines the quality level of chunks to fetch. There are largely two categories of approaches: throughput based and buffer-based. A throughput-based rate adaptation algorithm adjusts chunks' quality levels based on estimated throughput. The buffer-based approach, on the other hand, selects the bitrate level based on the player's buffer occupancy level, which implicitly encodes the network capacity information.

For today's immersive video delivery that downloads everything, it requires no change to a DASH algorithm. It is understood that in at least some embodiments, there may be interplay between any of the prediction-based streaming schemes disclosed herein and DASH. At least two categories of DASH algorithms are considered: throughput based and buffer-based. Throughput-based DASH algorithms can work well with the techniques disclosed herein, e.g., when an estimated throughput decreases (increases), the quality level of tiles will decrease (increase) correspondingly. It is understood that the thresholds for quality level switches can be set and/or otherwise adjusted, e.g., statically and/or dynamically. Due to projection and OOS tiles, the required bandwidth in our scheme has higher variance than that for non-360 videos. Thus, the thresholds may need to be adjusted dynamically.

Buffer-based DASH algorithms can also work well with the algorithms can work well with the techniques disclosed herein. One issue here is that in at least some of the disclosed techniques, the player may not want to keep a large buffer occupancy, because predicting viewer's head movement in the long term is difficult. As a result, since the player only maintains a relatively short duration of video contents in the buffer, buffer based DASH algorithms may interact poorly with at least some of the schemes disclosed herein.

Similar to regular DASH, the schemes disclosed herein, in at least some instances, can use HTTP(S) as an underlying delivery protocol. Each tile can be fetched by an HTTP request. A new observation here is that priorities of HTTP transactions play an important role in mitigating the user experience degradation caused by inaccurate prediction. Consider the following example. The player is in the progress of downloading tile "x" whose playback time is $t_2$. Then suddenly, the player realizes a predicted tile to be played at $t_1 < t_2$ is incorrect. To fix this issue, the player immediately issues a request for tile "y" whose playback time is $t_1$. Since the delivery of tile y is more urgent than tile x, ideally the server should pause the transmission of tile x, and transmit tile y expediently, e.g., at its full speed. This can be realized by giving tile y a higher priority than tile x. New web protocols such as HTTP/2 already support fine-grained control of HTTP transactions' priorities that are very useful in our scheme.

Beneficially, the cellular-friendly 360 video streaming frameworks disclosed herein do not require dependence on any specific projection scheme. Additionally, the disclosed techniques provide robust processes for tolerating prediction errors, for leveraging crowd-sourced playback statistics, and/or for integrating our scheme with DASH and/or HTTP protocols.

Figure 6:
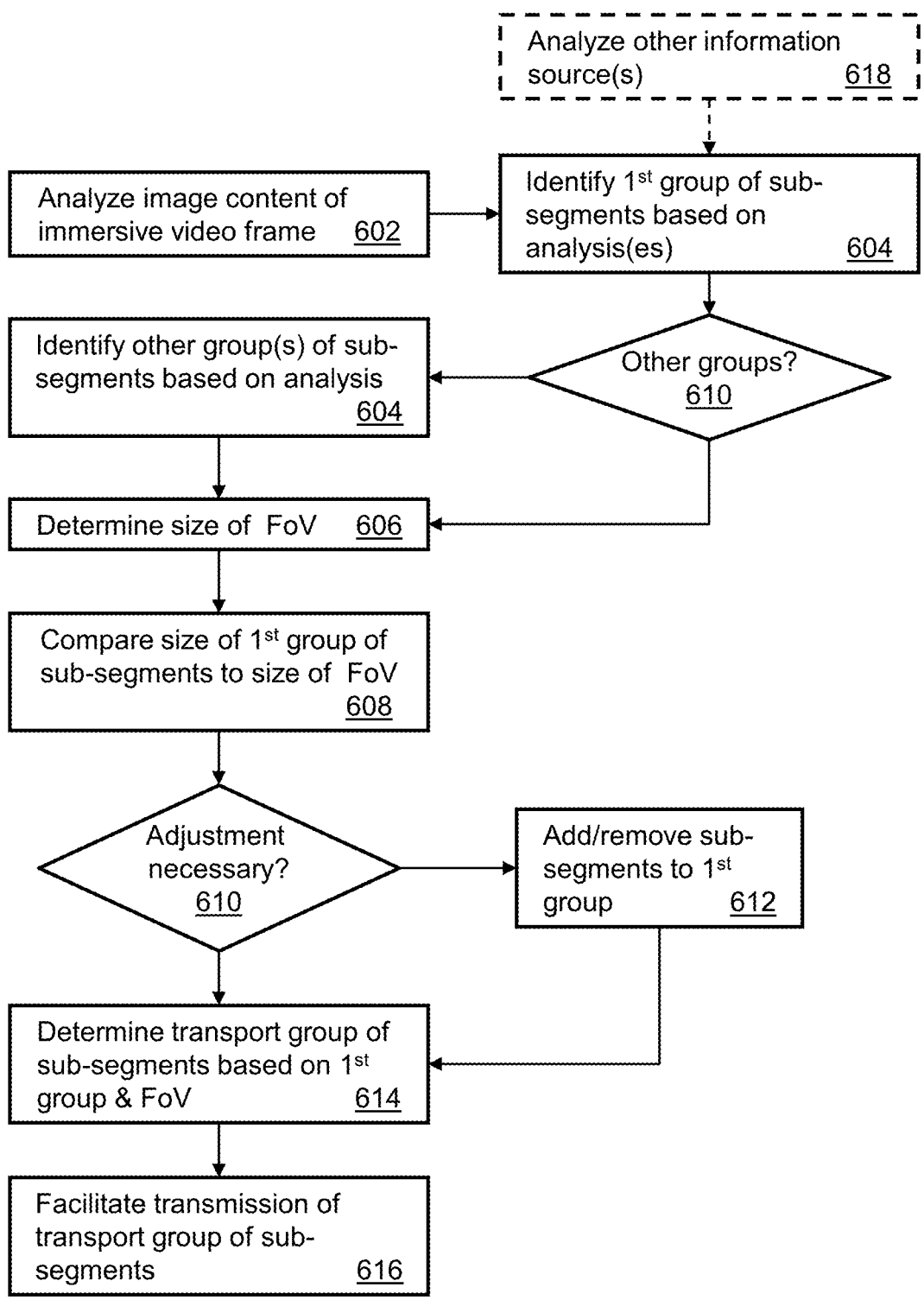
FIG. 6 depicts an illustrative embodiment of a process used in portions of the immersive video system described in FIGS. 1-2.

While for purposes of simplicity of explanation, the respective processes are shown and described as series of blocks in FIG. 6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the processes described herein.

FIG. 6 depicts an illustrative embodiment of a process 600 used in portions of the system described in FIG. 1. According to the process 600, image content of immersive video frame is analyzed at 602. The immersive video frame can be any of the various types of immersive video disclosed herein and/or otherwise generally known, including any video source in which a viewing system views and/or presents less than the entire video frame at any given time. The analysis can include without limitation image processing, video processing, thematic analysis, metadata analysis, and more generally, any analysis capable of providing insight to of an immersive media content item.

It is further understood that the analysis can be applied to a pre-segmented immersive video frame, a segmented immersive video frame and/or individual or groups of segments of an immersive video frame. In at least some embodiments, segmentation of an immersive video frame can be based at least in part on results of the analysis.

A first group of sub-segments is identified at 604, based on the analysis. For example, the analysis may identify one or more of an object portrayed within the immersive video frame, a color, a brightness, movement, image complexity or lack thereof, and the like. As the analysis results allow different segments and/or regions of the immersive video frame to be distinguished from other segments and/or regions, the first group of segments can be identified. Examples include, without limitation, the objects 508, 528, 565, 567 and/or regions 546 (FIGS. 5A-D).

In some embodiments, a size of a field of view and/or estimate of a size of a viewing area is determined at 606. The size of the field of view can be based on one or more of a hardware parameter, e.g., of the immersive video viewer, a device and/or user setting, e.g., zoom and/or pan, and so on. The size of the field of view can be determined in one or more of a pixel size and/or density, a physical size of the display, distance of a display from a viewer, a system default, a user preference, and so on.

A size of the first group of sub-segments is compared to a size of the field of view at 608. This comparison can be used to ensure that sufficient number of segments are provided to span a particular field of view. A determination is made at 610 as to whether any adjustment to the first group of segments is necessary based on the comparison to the size of the field of view. To the extent that adjustment is necessary, segments are added, removed and/or otherwise adjusted at 612. For instances in which an object and/or area of interest within an immersive video frame is smaller than the field of view size, additional segments can be added to a requested group based on the field of view size and/or orientation. For instance in which an object and/or area of interest is larger than a field of view, the field of view size can be used to remove segments of interest that extend beyond the field of view. It is envisioned that in at least some instances, processing can be accomplished without necessarily adjusting a requested and/or transported group of segments based on the field of view size.

A transport group of sub-segments is determined at 614 based on the identification of the first group of segments and the comparison to the size of the field of view. Identification of the transport group can be based on any of the various techniques disclosed herein. Transport of the transport group of sub-segments is facilitated at 616.

In some embodiments, the process 600 includes performing analysis, at 618, of information from other sources. For example, analysis of user information, such as user profile information, user preferences and/or historical user data can be analyzed to facilitate identification of a group of segments. The one or more analyses can include analysis of information related to a particular user, e.g., according to the techniques disclosed herein, and/or information obtained from other users. For example, the analyses can include frequency data, e.g., a heat map, of segments downloaded previously.

A heat map can be used to identify a viewing frequency of regions or segments of a 360 video frame. Without limitation, the regions and/or segments can range from individual pixels, to groups of pixels. Alternatively or in addition, the regions and/or segments can be based on a selected and/or predetermined segment size and/or shape. It is understood that in at least some embodiments, the size and/or shape of the regions can correspond to an angular extent in the displayed image, e.g., being adjusted, as necessary, based on a mapping.

In some embodiments, the heat map can assign a value, e.g., a number, a color, a pattern to regions or segments of a video frame, wherein the values can span a range from some minimum to some maximum. For example, the values can corresponds to total numbers of views of a particular region or segment, e.g., according to a histogram. Alternatively or in addition, the values can correspond to percentages of total views. In at least some embodiments, the heat map can include probability values, e.g., identifying a likelihood that a particular region/segment will be viewed in the future.

In at least some instances, the heat map, e.g., frequency data, can be tailored based on information relating to the particular user. Consider heat maps including all users, users of a certain age group, gender, affinity, and the like. With such distinctions, an appropriate heat map could be selected based on the current user. Without limitation, it is understood that analysis of other information can include analysis of current viewing parameters, such as current and/or recent viewing performance, e.g., according to the various techniques disclosed herein.

Figure 5A:
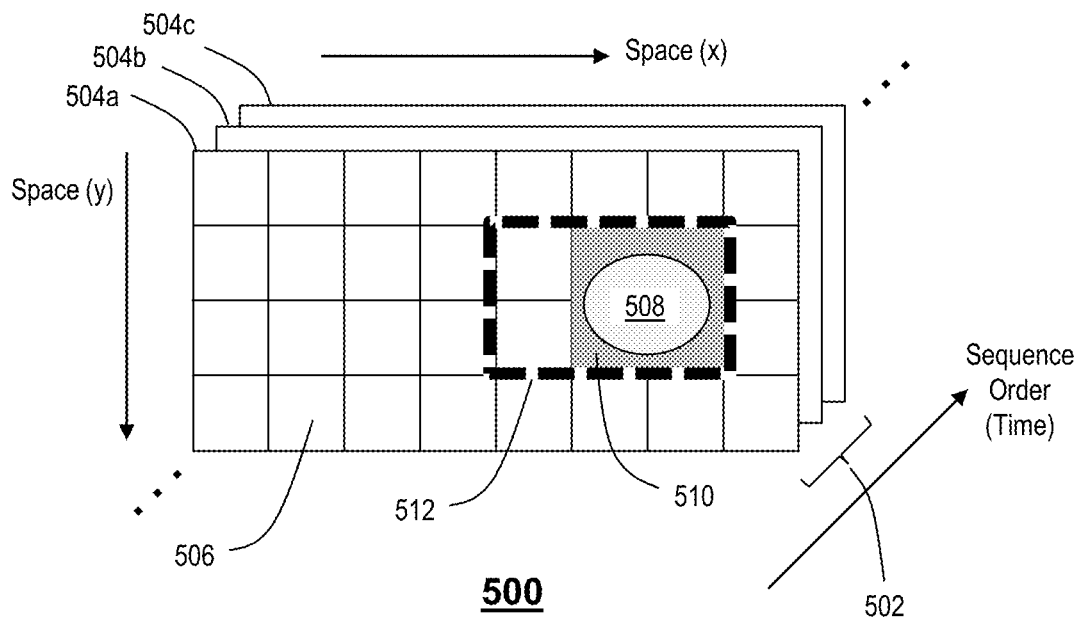
FIG. 5A depicts an illustrative embodiment of a portion of a sequence of immersive video frames that have been spatially segmented, including an object.

FIG. 5A depicts a schematic representation 500 of a portion of a sequence of immersive video frames that have been spatially segmented, including an object and a field of view. The example includes a group or "chunk" 502 of three successive immersive video frames 504a, 504b, 504c, generally 504. It is generally understood that one or more of the various techniques disclosed herein can be applied to the different chunks 502. The sequence of frames are processed or otherwise progress in time according to a frame rate, e.g., a number of frames per second. In at least some instances, the frame rate would be faster than typical head movements of an immersive video viewer. This allows the segment selection techniques of one immersive video frame to be applied to a group of successive frames, without necessarily having to repeat the segment selection process.

By way of illustrative example, a frame rate may be 24 frames per second (fps), 25 fps, 30 fps, 60 fps, and so on. Frame rates can be determined according to standards, e.g., movies, television, gaming, and the like. In some embodiments, frame rates can depend on the subject matter of the video. If an anticipated head movement is on the order of $\frac{1}{10}^{th}$ of a second, then a video chunk 502 may contain 2, 3, or 6 frames, or perhaps some other number depending on an underlying frame rate. If head movement is expected to occur at a different rate, e.g., slower, say on the order of ¼ sec, then the video chunk 502 may contain 6, 8, 15, or perhaps some other number of frames. In either instance, a group of segments selected for transport in one frame, say a first frame 504a of the video chunk 502, can be applied to the remaining number of video frames 504 of the video chunk 502. The process can be repeated for successive chunks, e.g., selecting a new group of segments for transport, and using the same newly selected group of segments for each of the video frames 504 of the subsequent video chunk 502, and so on.

It is envisioned that in at least some embodiments, a video chunk size can depend upon one of a viewer's gaze or head movement, e.g., a direction of a line of sight and/or orientation of a field of view of the viewer. Thus, if a user's gaze is relatively stationary, then the video chunk size can be extended, e.g., from $\frac{1}{10}^{th}$ sec to ½ sec, or greater. In some embodiments, the video chunk size can depend on the immersive video itself and/or objects portrayed in the immersive video. For example, in a relatively stationary scene, such as a landscape, the video chunk size may be increased or extended. Conversely, in a relatively active scene, e.g., in which one or more objects portrayed in the immersive video frame are moving, then the video chunk size may be decreased or reduced. Alternatively or in addition, a group of selected segments can be applied to successive video frames until there is an occurrence of an event, such as a change in a viewer's gaze and/or a change of scene and/or movement of objects portrayed within a scene.

Continuing with the illustrative example, each immersive video frame 504 include a two dimensional array of segments 506. The example schematic includes a 4 by 8 array of segments 506, e.g., 32 segments per frame. It is understood that the immersive video frames 504 can portray objects within a scene. The example includes an object 508. As the object is portrayed relative to an entire scene of an entire immersive video frame, it is understood that the object may occupy one or more segments 506. The example object 508 is contained within the shaded region 510 of four segments 506. If a viewer directs his/her gaze towards the object 508, then those segments of the shaded region 510 containing the object 508 can be identified for transport.

In at least some embodiments, the object 508 can be identified and or located based on analysis of the immersive video frame 504. For example, the analysis can include image processing and/or feature recognition. In some instances, a target object is determined beforehand. Consider sporting events, in which moving objects, such as players, a ball or puck, are expected to be portrayed within an image. Image processing can identify and/or estimate location(s) of one or more such objects 508. It is beneficially to identify such objects as a gaze of an immersive video viewer is likely to follow such objects 508. Even if objects cannot be identified with 100% accuracy or certainty, estimates of locations of such objects can be used to determine which segments are more likely to fall within a viewer's gaze.

In some embodiments, movement of such objects can be determined, e.g., by comparison of the same object 508 in different immersive video frames to determine a direction and/or vector associated with the movement. A vector value can include an estimate of a rate of change of position and a direction. Such values and/or estimates can be used to position the field of view 512, e.g., adding extra or filler segments based on a direction and/or rate of change in position. Thus, if the example object 508 were moving to the left, the extra unshaded segments 506 of the field of view 512 would provide some buffer region to accommodate or otherwise anticipate movement along the trajectory.

It is understood that a viewer's gaze is related to a field of view. The field of view, in at least some instances, is based on an immersive video viewer device. Namely, a display region or surface 113 (FIG. 1) of a video player is generally capable of presenting a sub-region of an immersive video presentation based on a field of view of the device. The particular sub-region of the immersive video presentation is based on an orientation of the viewed region based on the field of view. An example field of view 512 is represented by a dashed rectangle. In this instance, the field of view corresponds to a 2 by 3 group of segments. It is understood that the actual field of view may include a greater or lesser number of segments that may or may not correspond to a rectangle based on an orientation of the viewer's gaze. For situations in which the size of the field of view is greater than a size of the group of segments 510 portraying the object 508, the number of segments identified for transport can be increased to at least correspond to the size of the field of view, e.g., 2 by 6 segments in the illustrative example.

Accordingly, the segments to cover the field of view 512 that also include the segments 510 containing the object 508 can be identified for transport for each frame of the video chunk 502. The other segments of the immersive video frame 504, e.g., those segments 506 outside of the field of view 512 do not necessarily need to be transported for the frames 504 of the video chunk 502. In at least some embodiments, an even greater number of segments, e.g., corresponding to an image region greater than that associated with the field of view can be identified for transport. For example, some number and/or depth of bounding segments can be identified for transport to account for errors, sudden movement of the viewer's gaze, and so on.

In some instances, the location of the field of view 512 is based on the size of the field of view without necessarily having any knowledge of an orientation of an actual field of view. Selecting segments 506 based on the size of the field of view 512 ensures that a sufficient number of segments 506 are identified for transport to cover or otherwise fill a display screen corresponding to the field of view.

Figure 5B:
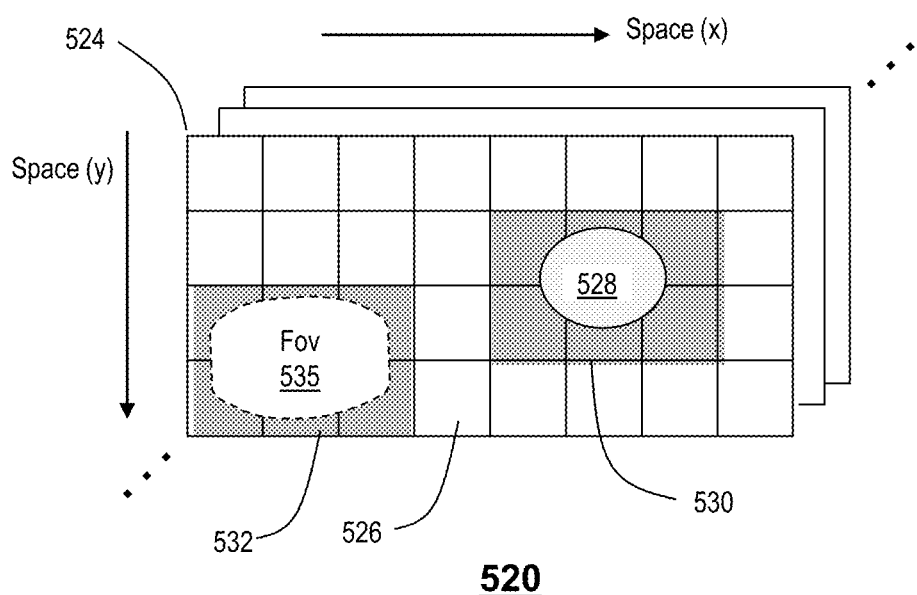
FIG. 5B depicts an illustrative embodiment of a portion of a sequence of immersive video frames that have been spatially segmented, including an object and a field of view.

FIG. 5B depicts a schematic representation of a video chunk 520 or sequence of immersive video frames 524 that have been spatially segmented, including an object 528 and a field of view 535. Once again, an object 528 is identified within an immersive video frame 524 and a first group of segments 530 is identified as containing the object. Location of the object and selection of the first group of segments 530 can be used to identify a likely gaze of the immersive video viewer. Namely, the viewer is likely to be looking at a sub-region of the immersive video that contains the object 528. However, in this instance, another field of view 535 is identified within the immersive video frame 524.

The field of view 535 can correspond to a determined gaze and/or orientation of an immersive video viewer. The gaze and/or field of view orientation 535 can be based on one or more of an actual measurement of the gaze of the immersive video viewer, e.g., a pitch, roll and yaw, an estimate of the gaze of the viewer and/or a prediction of the gaze of the viewer. Another group of segments 532 is identified based on the determined field of view 535. The other group of segments 532 includes a region corresponding to the field of view 535.

Figure 5C:
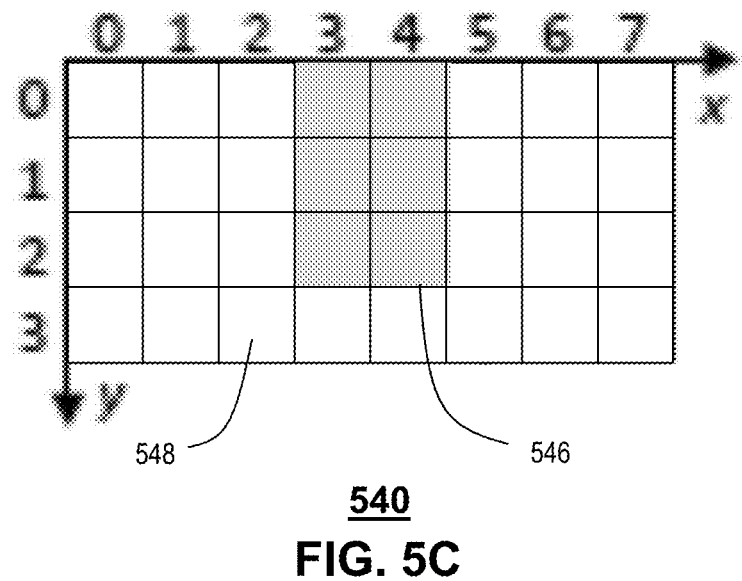
FIG. 5C depicts an illustrative embodiment of an immersive video frame that has been spatially segmented, including a prime viewing area.

FIG. 5C depicts an illustrative embodiment of an immersive video frame 540 that has been spatially segmented in to a 4 by 8 arrangement of video segments. In at least some embodiments, one or more segments and/or groups of segments can be identified or otherwise distinguished from other segments. The illustrative example includes a first group of segments 546 illustrated by shading to distinguish this group from other segments 548 of the immersive video frame 540. Identification of segments of the first group 546 can be accomplished based on one or more of the video itself, e.g., the characteristics, contents or make-up of the video frame, metadata associated with the video, statistics based on other views, characteristics of a particular user, e.g., by way of a user profile, current viewing parameters and predictions based on past viewing parameters.

By way of illustrative example, video and/or image processing can be applied to the video frame 540 and/or a group of video frames 502 (FIG. 5A). The image processing and/or image or video analysis can distinguish segments based on one or more of color, sharpness, lightness/darkness, complexity, e.g., pixel variations, spatial frequencies, line detections, and the like. Alternatively or in addition, the video and/or frame analysis can be based on motion detection to distinguish segments and/or regions of segments that include moving objects, and/or are relatively stationary. For example, the first group of segments 546 may include a relatively bright sub-region of the immersive video frame 540, at least in contrast to the other sub-region(s) 548 of the immersive video frame 540.

In at least some embodiments, the analysis can be based on one or more elements of metadata. Metadata can include, without limitation, an immersive video program category, e.g., sports, drama, news, children's programming, and the like. Alternatively or in addition, the metadata can include a scene category, e.g., indoor, outdoor, fast moving, natural lighting, and so on. Other metadata may include actor identities, information relative to an event, such as a score of a sporting event, weather condition, etc. By way of further example, metadata identifying a principal actor can be combined with facial recognition processing to identify a principal actor in a scene. Since actions of a principal actor may be more likely to be followed or viewed in a scene, those immersive video segments containing the principal actor can be identified or otherwise distinguished or estimated as the first group of segments 546.

Accordingly, the first group of segments 546 can be transported to a viewing system according to a likelihood that this group 546 will correspond to a viewer's field of view. It is understood that the first group of segments 546 can be adjusted to add and/or subtract image segments based on a size and/or orientation of a field-of-view of a particular viewing system, and/or an actual, predicted and/or otherwise estimated orientation of a field of view of a particular viewer during a viewing of the immersive video content.

Figure 5D:
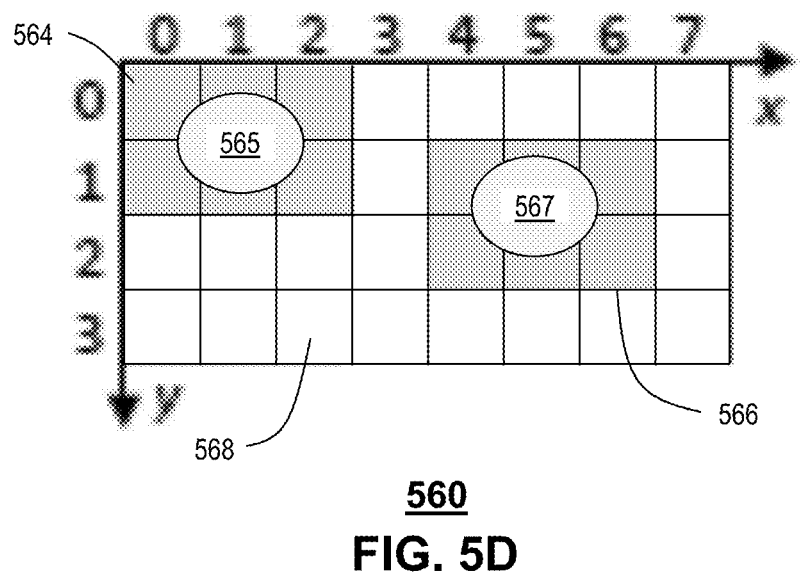
FIG. 5D depicts an illustrative embodiment of an immersive video frame that has been spatially segmented, including multiple objects.

FIG. 5D depicts an illustrative embodiment of an immersive video frame 560 that has been spatially segmented in to a 4 by 8 arrangement of video segments. In this example, two objects have been identified, a first object 565 and a second object 567. Likewise, a first group of segments 564 is identified in association with the first object 565 and a second group of segments 566 is identified in association with the second object 567. In at least some embodiments, both groups of immersive video frame segments 564, 566 can be transported to an immersive video viewer, without necessarily transporting other segments 568 of the immersive video frame that are not associated with either object 565, 567. In the illustrative example, transport of both groups 564, 566 includes 12 segments, resulting in a transport savings of about 62.5%, i.e., the 20 non-transported segments of the total 32 segments of the segmented immersive video frame 560. Of course, the actual bandwidth savings may differ based on overhead, transport processing, and the like.

Figure 7:
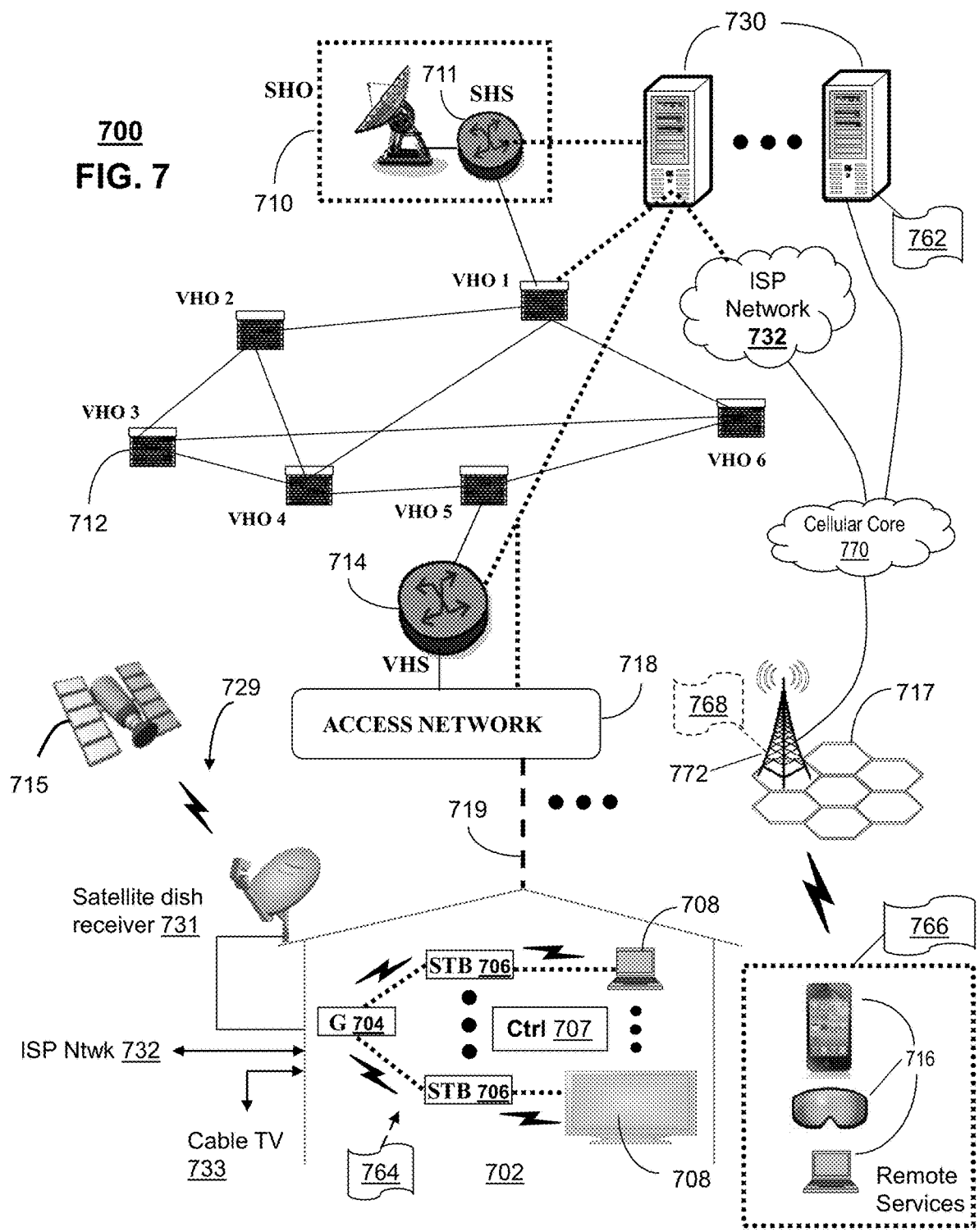
FIGS. 7-8 depict illustrative embodiments of communication systems that provide media services.

FIG. 7 depicts an illustrative embodiment of a communication system 700 for providing various communication services, such as delivering media content. The communication system 700 can represent an interactive media network, such as an interactive television system (e.g., an Internet Protocol Television (IPTV) media system). Communication system 700 can be overlaid or operably coupled with the video viewing system 200 of FIG. 2, as another representative embodiment of communication system 700. For instance, one or more devices illustrated in the communication system 700 of FIG. 7, analyze image content of an immersive video frame to identify a first subset of frame segments that span an entire space portrayed by the immersive video frame, determine a second subset of frame segments based on the first subset and a size of a display region or field of view, and/or transport the second subset of frame segments to a viewing or presentation system. It is understood that the second subset of frame segments spans less than the entire frame, such that the communication network 700 need not transport all of the segments of any particular video frame or sequence of frames, e.g., chunk of video.

In one or more embodiments, the communication system 700 can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol. The VHS 714 can distribute multimedia broadcast content via an access network 718 to commercial and/or residential buildings 702 housing a gateway 704 (such as a residential or commercial gateway).

The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as a virtual reality (VR) processor (herein referred to as a VR processor 730). The VR processor 730 can use computing and communication technology to perform function 762, which can include among other things, the virtual reality processing techniques described by the process 600 of FIG. 6. For instance, function 762 of the VR processor 730 can be similar to the functions described for the immersive video server 102 of FIG. 1 in accordance with the process 600 of FIG. 6. The media processors 706 and wireless communication devices 716 can be provisioned with software functions 764 and 766, respectively, to utilize the services of the VR processor 730. For instance, functions 764 and 766 of media processors 706 and wireless communication devices 716 can be similar to the functions described for the immersive video client device 106 of FIG. 1 in accordance with process 600 of FIG. 6.

In at least some embodiments, the cellular network 717 includes a cellular core network 770 performing one or more core functions based on the applicable cellular protocols, e.g., 3GPP LTE, 5 G, and the like. According to the illustrative embodiment, the cellular core network 770 can be in communication with the VR processor 730, e.g., via a network connection, such as an Internet connection. Alternatively or in addition, the VR processor 730 can be collocated with equipment of the cellular core network 770, e.g., at a common data center.

Although certain functions are disclosed at different locations in relation to the cellular network, it is understood that one or more of the various functions can be implemented at one or more different locations. For example, the immersive video client 106 can be implemented within a video player, and/or within a separate processor in local communication with the video player. With respect to the mobile wireless network 108, the foregoing locations would be at a UE portion of a wireless link. Likewise, the immersive video server 102 can be implemented within a server in communication with one or more of a mobile core network 770 and or a mobile base station, e.g., an eNB 772. For instance, functions 768 of the eNB 772 can be similar to the functions described for the immersive video server 102 of FIG. 1 in accordance with process 600 of FIG. 6.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
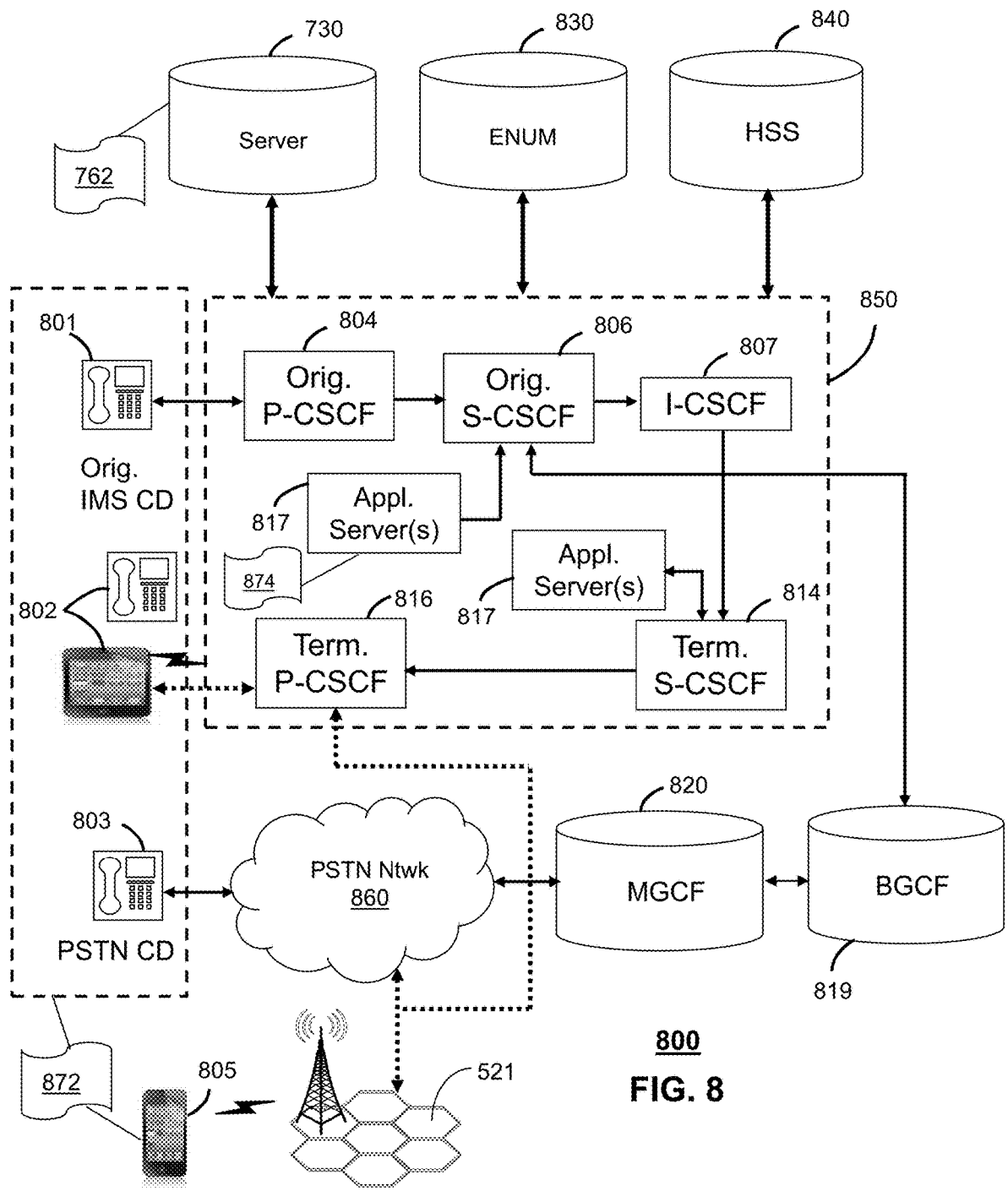

FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with the viewing system 200 of FIG. 2 and communication system 700 as another representative embodiment of communication system 700. Elements of the communication system 700, alone or in combination with the viewing system 200 (FIG. 2), analyze image content of an immersive video frame to identify a first subset of frame segments that span an entire space portrayed by the immersive video frame, determine a second subset of frame segments based on the first subset and a size of a display region or field of view, and/or transport the second subset of frame segments to a viewing or presentation system. It is understood that the second subset of frame segments spans less than the entire frame, such that the communication network 700 need not transport all of the segments of any particular video frame or sequence of frames, e.g., chunk of video.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, process, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, process, step, or functionality described herein in accordance with a respective function, server, or computer.

The VR processor 730 of FIG. 7 can be operably coupled to communication system 800 for purposes similar to those described above. The VR processor 730 can perform function 762 and thereby provide virtual reality processing services to the CDs 801, 802, 803 and 805 of FIG. 8, e.g., similar to the functions described for the VR processor 730 of FIG. 7 in accordance with the process 600 of FIG. 6. CDs 801, 802, 803 and 805, which can be adapted with software to perform function 872 to utilize the services of the VR processor 730, e.g., similar to the functions described for the immersive video server 102 of FIG. 1 in accordance with the process 600 of FIG. 6. The VR processor 730 can be an integral part of the application server(s) 817 performing function 874, which can be substantially similar to function 762 and adapted to the operations of the IMS network 850.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 9:
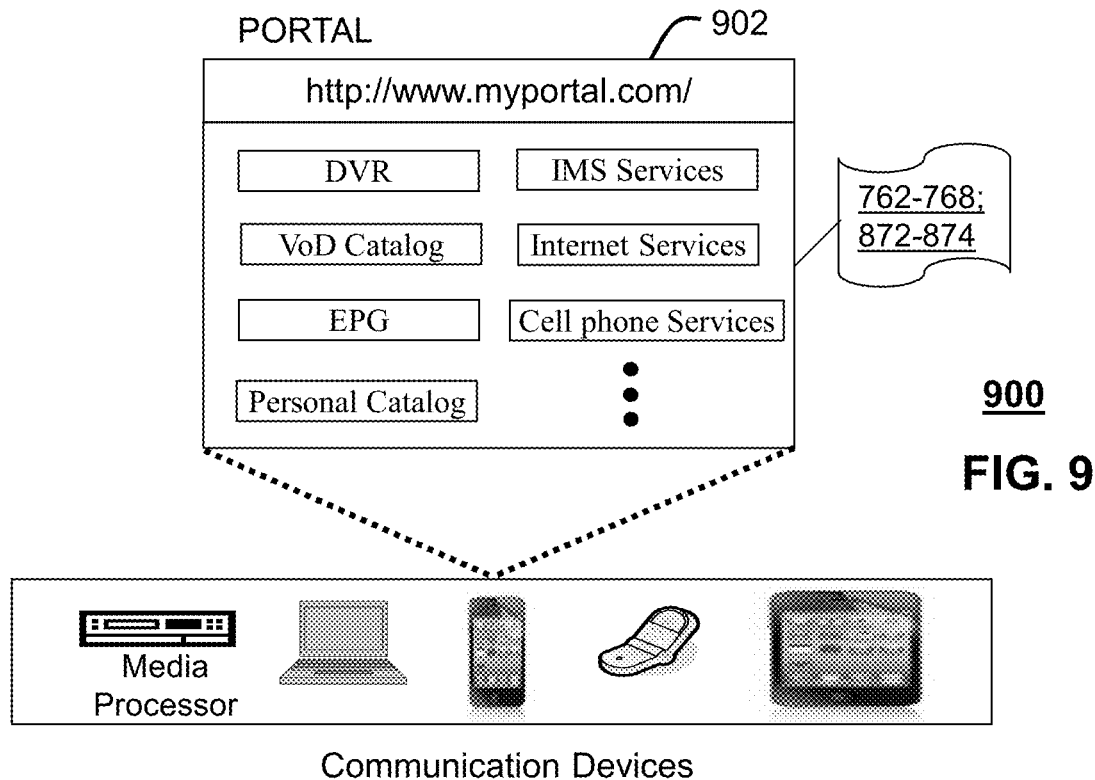
FIG. 9 depicts an illustrative embodiment of a web portal for interacting with the immersive video system described in FIGS. 1-2, and the communication systems described in FIGS. 7-8.

FIG. 9 depicts an illustrative embodiment of a web portal 902 of a communication system 900. Communication system 900 can be overlaid or operably coupled with one or more of the immersive video server 102 and/or the immersive video client 106 in the system 100 of FIG. 1, and/or the viewing system 200 of FIG. 2, the communication system 700, and/or the communication system 800 as another representative embodiment of the immersive video server 102 and/or the immersive video client 106 in the system 100 of FIG. 1, and/or the viewing system 200 of FIG. 2, communication system 700, and/or communication system 800. The web portal 902 can be used for managing services of the immersive video server 102 and/or the immersive video client 106 in the system 100 of FIG. 1, and/or the viewing system 200 of FIG. 2 and devices of communication systems 700-800, such as the VR processors 730. A web page of the web portal 902 can be accessed by a Uniform Resource Locator (URL) with an Internet browser using an Internet-capable communication device such as those described in FIG. 1-2 and FIGS. 7-8. The web portal 902 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 902 can also be used for provisioning IMS services described earlier, provisioning Internet services, provisioning cellular phone services, and so on.

The web portal 902 can further be utilized to manage and provision software applications 762-766, and 872-874 to adapt these applications as may be desired by subscribers and/or service providers of the immersive video processing system 100 of FIG. 1, and communication systems 700-800. For instance, users of the services provided by the viewing system 200 and/or the VR processor 730 can log into their on-line accounts and provision the systems 200 or processors 730 with information, e.g., such as user profiles, providing equipment identifications and/or descriptions, such as the viewing system, identification of video content item(s), video source(s), authentication and/or authorization information, contact information to server to enable it to communication with devices described in FIGS. 2-8, and so on. Service providers can log onto an administrator account to provision, monitor and/or maintain the immersive video server 102 and/or the immersive video client 106 in the system 100 of FIG. 1, and/or the viewing system 200 of FIG. 2 and/or the VR processor 730.

Figure 10:
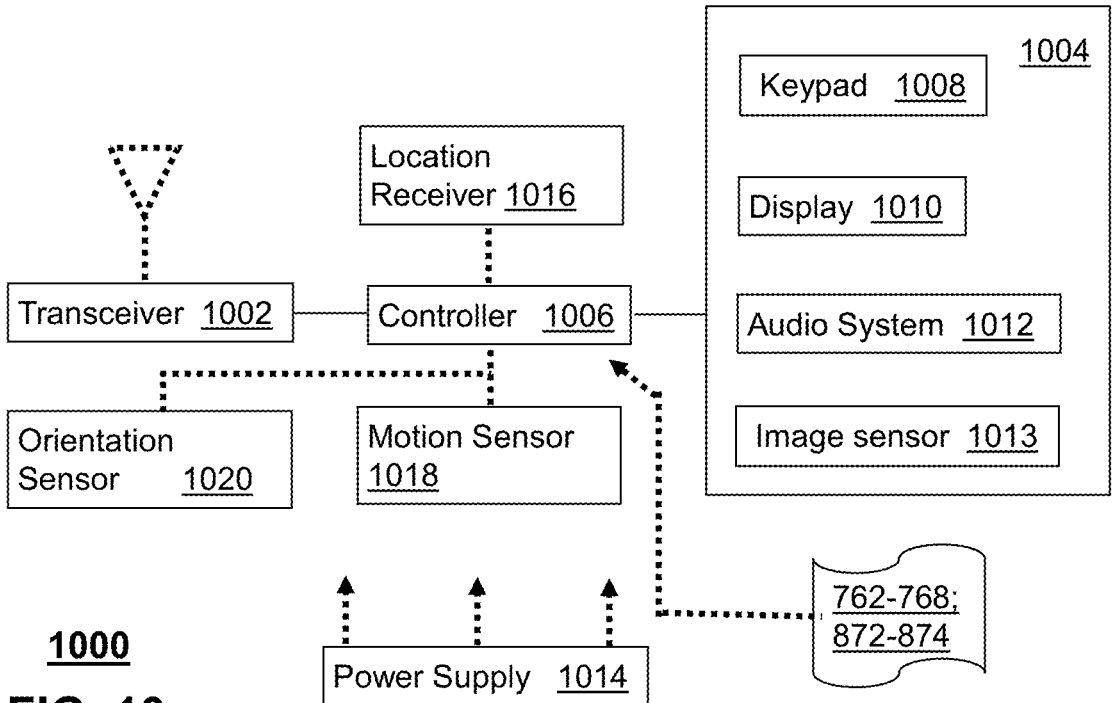
FIG. 10 depicts an illustrative embodiment of a communication device for interacting with the immersive video system described in FIGS. 1-2, and the communication systems described in FIG. 7-.

FIG. 10 depicts an illustrative embodiment of a communication device 1000. Communication device 1000 can serve in whole or in part as an illustrative embodiment of the devices 106, 110, 112, 200 depicted in FIGS. 1-2, and FIGS. 7-8 and can be configured to perform portions of the process 600 of FIG. 6.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize position and/or orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of the viewing system 200, the media processor 706, the media devices 708, or the portable communication devices 716 of FIG. 7, as well as the IMS CDs 801-802 and PSTN CDs 803-805 of FIG. 8. It will be appreciated that the communication device 700 can also represent other devices that can operate in the system 100 of FIG. 1, the VR processor 200 of FIG. 2, communication systems 700-800 of FIGS. 7-8 such as a gaming console and a media player. In addition, the controller 706 can be adapted in various embodiments to perform the functions 762-766 and 872-874, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
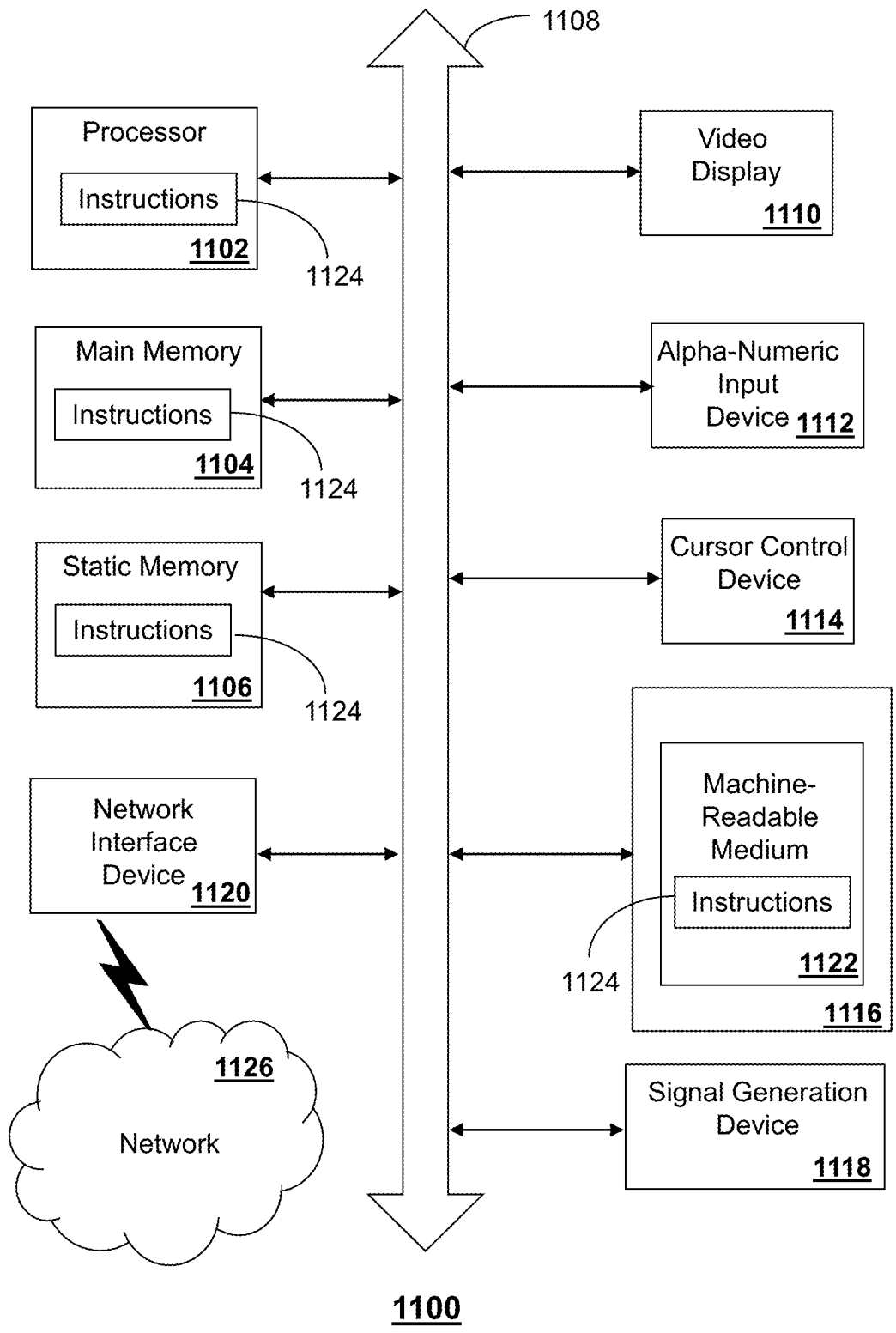
FIG. 11 is a diagrammatic representation of a machine in the form of a computer system within which a set of instructions, when executed, may cause the machine to perform any one or more of the processes described herein.

FIG. 11 depicts an exemplary diagrammatic representation of a machine in the form of a computer system 1100 within which a set of instructions, when executed, may cause the machine to perform any one or more of the processes described above. One or more instances of the machine can operate, for example, as the viewing system 200, the VR processor 730, the media processor 706 and other devices of FIGS. 1-2 and 7-10. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the processes discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods, processes or functions described herein, including those processes illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the processes described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or processes described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the processes described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or processes may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods or processes of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various processes including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This process of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
analyzing, by a processing system including a processor, image content of a first immersive video frame of a sequence of immersive video frames, to obtain an analysis result;
selecting, by the processing system, a first group of spatial segments of a plurality of spatial segments of the sequence of immersive video frames based on the analysis result, wherein the plurality of spatial segments collectively span an entire temporal image space portrayed by the sequence of immersive video frames, and wherein the first group of spatial segments spans less than an entire image space portrayed by the first immersive video frame;
determining, by the processing system, a field-of-view of an immersive video viewer, wherein the field-of-view spans less than the entire image space portrayed by the first immersive video frame;
identifying, by the processing system, a second group of spatial segments of the plurality of spatial segments based on the selecting of the first group of spatial segments and the determining of the field-of-view, wherein the second group of spatial segments spans less than the entire image space portrayed by the first immersive video frame; and
facilitating, by the processing system, transport of the second group of spatial segments via a communication network to the immersive video viewer for presentation at the immersive video viewer, without requiring transmission of all of the plurality of spatial segments.

2. The method of claim 1, wherein the analyzing further comprises:
applying, by the processing system, image processing to the image content of the first immersive video frame; and
identifying, by the processing system, an object portrayed in the image content based on the image processing.

3. The method of claim 2, wherein the selecting of the first group of spatial segments further comprises associating, by the processing system, segments of the plurality of spatial segments that comprise a portion of the object, with the first group of spatial segments.

4. The method of claim 1, wherein the analyzing further comprises:
obtaining heat-map data indicating viewing frequencies of sub-regions of the first immersive video frame of the sequence of immersive video frames.

5. The method of claim 4, wherein the identifying of the second group of spatial segments of the plurality of spatial segments comprises predicting a position of the field-of-view within the first immersive video frame based on the heat-map data.

6. The method of claim 1, wherein the identifying of the second group of spatial segments further comprises:
determining, by the processing system, an overlap of the field-of-view and the first group of spatial segments and the determining of the field-of-view, wherein the second group of spatial segments spans the field-of-view in its entirety, while spanning less than the entire image space portrayed by the first immersive video frame.

7. The method of claim 1, further comprising:
selecting, by the processing system, a third group of spatial segments of the plurality of spatial segments based on second group of spatial segments, wherein the selecting of the third group of spatial segments is not based on analysis of image content of a second immersive video frame of the sequence of immersive video frames.

8. The method of claim 1, wherein the plurality of spatial segments is non-overlapping.

9. The method of claim 1, wherein the field-of-view is based on an estimate of an orientation of the immersive video viewer, the method further comprising:
predicting, by the processing system, the orientation of the immersive video viewer to obtain a prediction, wherein the estimate of the orientation of the immersive video viewer is based on the prediction of the orientation of the immersive video viewer.

10. The method of claim 1, further comprising:
identifying, by the processing system, an identity of a user of the immersive video viewer; and
determining, by the processing system, a viewer characteristic based on the identity of the user of the immersive video viewer, wherein the identifying of the second group of spatial segments of the plurality of spatial segments is further based on the viewer characteristic.

11. The method of claim 10, wherein the analyzing of the image content of the first immersive video frame is based on the viewer characteristic.

12. The method of claim 10, wherein the determining of the viewer characteristic further comprises:
accessing, by the processing system, a user profile associated with the identity of the user.

13. A non-transitory, machine-readable storage medium, comprising executable instructions that, when executed by a processing system including a processor, facilitate performance of operations, the operations comprising:
processing image content of a first immersive video frame of a sequence of immersive video frames, to obtain an image processing result;
selecting a first group of segments of a plurality of segments of the sequence of immersive video frames based on the image processing result, wherein the plurality of segments collectively span an entire temporal image space portrayed by the sequence of immersive video frames, and wherein the first group of segments spans less than an entire image space portrayed by the first immersive video frame;
determining a field-of-view of an immersive video viewer, wherein the field-of-view spans less than the entire image space portrayed by the first immersive video frame;
determining, by the processing system a second group of segments of the plurality of segments based on the selecting of the first group of segments and the determining of the field-of-view, wherein the second group of segments spans less than the entire image space portrayed by the first immersive video frame; and
facilitating transport of the second group of segments via a communication network to the immersive video viewer for presentation at the immersive video viewer, without requiring transmission of all of the plurality of segments.

14. The non-transitory, machine-readable storage medium of claim 13, wherein the operations further comprise:
applying, by the processing system, image processing to the image content of the first immersive video frame; and
identifying, by the processing system, an object portrayed in the image content based on the image processing.

15. The non-transitory, machine-readable storage medium of claim 14, wherein the selecting of the first group of segments further comprises associating, by the processing system, segments of the plurality of segments that comprise a portion of the object, with the first group of segments.

16. The non-transitory, machine-readable storage medium of claim 13, wherein the plurality of segments is non-overlapping.

17. The non-transitory, machine-readable storage medium of claim 13, wherein the determining of the second group of segments further comprises:
determining, by the processing system, an overlap of the field-of-view and the first group of segments and the determining of the field-of-view, wherein the second group of segments spans the field-of-view in its entirety, while spanning less than the entire image space portrayed by the first immersive video frame.

18. A device, comprising:
a processing system including a processor; and
a memory that stores executable instructions that, when executed by the processing system, facilitate performance of operations, the operations comprising:
processing image content of an immersive video frame of a sequence of immersive video frames, to obtain an image processing result;
identifying a first group of segments of a plurality of segments of the sequence of immersive video frames based on the image processing result, wherein the plurality of segments collectively span an entire temporal image space portrayed by the sequence of immersive video frames, and wherein the first group of segments spans less than an entire image space portrayed by the immersive video frame;
determining a size of a display region of an immersive video viewer, wherein the size of the display region spans less than the entire image space portrayed by the immersive video frame;
determining, by the processing system a second group of segments of the plurality of segments based on the identifying of the first group of segments and the determining of the size of the display region, wherein the second group of segments spans less than the entire image space portrayed by the immersive video frame; and
facilitating transport of the second group of segments via a communication network to the immersive video viewer for presentation at the immersive video viewer, without requiring transmission of all of the plurality of segments.

19. The device of claim 18, wherein the operations further comprise:
applying image processing to the image content of the immersive video frame; and
identifying an object portrayed in the image content based on the image processing.

20. The device of claim 19, wherein the identifying of the first group of segments further comprises:
determining a portion of the object is portrayed.

* * * * *